US012369725B2

(12) United States Patent
Mouhamadou et al.

(10) Patent No.: US 12,369,725 B2
(45) Date of Patent: Jul. 29, 2025

(54) TRAPPING BED NET FOR MOSQUITO CONTROL

(71) Applicant: North Carolina State University, Raleigh, NC (US)

(72) Inventors: Chouaïbou Seïdou Mouhamadou, Raleigh, NC (US); Richard Michael Roe, Raleigh, NC (US); Robert D. Mitchell, III, Raleigh, NC (US); Charles S. Apperson, Raleigh, NC (US); Marian Gayle McCord, Durham, NH (US); Andre J. West, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 396 days.

(21) Appl. No.: 17/632,574

(22) PCT Filed: Aug. 6, 2020

(86) PCT No.: PCT/US2020/045184
§ 371 (c)(1),
(2) Date: Feb. 3, 2022

(87) PCT Pub. No.: WO2021/026341
PCT Pub. Date: Feb. 11, 2021

(65) Prior Publication Data
US 2022/0273117 A1 Sep. 1, 2022

Related U.S. Application Data

(60) Provisional application No. 62/883,625, filed on Aug. 6, 2019.

(51) Int. Cl.
*A47C 29/00* (2006.01)
*A01M 1/10* (2006.01)
*A45F 3/52* (2006.01)

(52) U.S. Cl.
CPC .......... *A47C 29/006* (2013.01); *A01M 1/106* (2013.01); *A45F 3/52* (2013.01); *A01M 2200/012* (2013.01)

(58) Field of Classification Search
CPC ......... A47C 29/006; A01M 1/106; A45F 3/52
See application file for complete search history.

(56) References Cited

U.S. PATENT DOCUMENTS

| 152,600 A | * | 6/1874 | Carter | ................... | A01M 1/106 43/118 |
| 326,316 A | * | 9/1885 | Mitchell | .............. | A47C 29/006 5/415 |

(Continued)

FOREIGN PATENT DOCUMENTS

| CN | 201492097 U | 6/2010 |
| CN | 201709886 U | 1/2011 |

(Continued)

OTHER PUBLICATIONS

Merged translation of WO_2016036262 (Year: 2016).*

(Continued)

*Primary Examiner* — Morgan T Jordan
(74) *Attorney, Agent, or Firm* — Jenkins, Taylor & Hunt, P.A.

(57) ABSTRACT

A mosquito control net includes an occupant chamber and a trap chamber disposed over the occupant chamber. The trap chamber has one or more openings disposed on an outer surface thereof, through which mosquitos enter the trap chamber, the openings having receptacles attached therein and extending within the trap chamber to inhibit egression of mosquitos from the trap chamber after entry. A method for preventing mosquito bites for a subject can include providing such a mosquito control net and having the subject occupy it. A kit of parts for converting a conventional mosquito control net into a trapping mosquito control net (Continued)

can comprise a funnel-shaped receptacle surrounded by a bag, the bag being substantially impermeable to mosquitos and the receptacle and/or the bag being attachable to a top surface of the conventional mosquito control net to form a trap compartment.

18 Claims, 16 Drawing Sheets

(56) References Cited

U.S. PATENT DOCUMENTS

| | | | | |
|---|---|---|---|---|
| 363,861 | A * | 5/1887 | Tarbell | A01M 1/106 160/16 |
| 545,842 | A * | 9/1895 | Block | A01M 1/106 43/119 |
| 580,163 | A * | 4/1897 | Richter | A01M 1/106 43/107 |
| 635,732 | A * | 10/1899 | Hammond | A01M 1/106 119/661 |
| 714,992 | A * | 12/1902 | Arnold | A01M 1/106 43/118 |
| 736,827 | A * | 8/1903 | Davison | A01M 1/106 43/119 |
| 771,647 | A * | 10/1904 | Lacaille | A01M 1/106 43/119 |
| 776,643 | A * | 12/1904 | Casey | A01M 1/106 43/119 |
| 910,492 | A * | 1/1909 | Bowen | A01M 1/106 43/119 |
| 957,049 | A * | 5/1910 | French | A01M 1/106 43/119 |
| 985,626 | A * | 2/1911 | Orr | A01M 1/106 43/119 |
| 989,314 | A * | 4/1911 | Webb | A01M 1/106 43/119 |
| 1,037,727 | A * | 9/1912 | Clark | A01M 1/106 43/119 |
| 1,044,642 | A * | 11/1912 | Graf | A01M 1/106 48/119 |
| 1,081,369 | A * | 12/1913 | Critzer et al. | A01M 1/106 43/119 |
| 1,114,191 | A * | 10/1914 | Shapiro | A01M 1/106 43/120 |
| 1,249,528 | A * | 12/1917 | Sipp | A01M 1/106 43/120 |
| 1,260,339 | A * | 3/1918 | Crockenberger | A01K 13/001 119/664 |
| 1,340,071 | A * | 5/1920 | Merrell | A01M 29/34 119/652 |
| 1,442,992 | A * | 1/1923 | Banes | A01M 1/02 43/118 |
| 1,450,855 | A * | 4/1923 | Hildreth | A01M 1/24 43/119 |
| 1,544,334 | A * | 6/1925 | Martin | A01M 1/106 43/119 |
| 1,566,032 | A * | 12/1925 | Martin | A01M 1/106 43/119 |
| 1,607,249 | A * | 11/1926 | Dyer | A01M 1/106 43/120 |
| 1,717,708 | A * | 6/1929 | Johnson | A01M 1/10 43/118 |
| 3,340,646 | A * | 9/1967 | Jadick | A01M 1/106 43/118 |
| 3,885,341 | A * | 5/1975 | Kuchenbecker | A01M 1/106 43/65 |
| 4,939,803 | A * | 7/1990 | Waters | A61G 1/04 5/113 |
| 5,257,474 | A * | 11/1993 | Burgos | A01M 1/24 43/107 |
| 6,263,894 | B1 | 7/2001 | LaMantia | |
| 7,503,142 | B1 * | 3/2009 | Uhl | A01M 1/106 141/331 |
| 7,694,455 | B1 * | 4/2010 | Bowden | A01M 1/106 43/132.1 |
| 8,950,108 | B1 * | 2/2015 | Morris | A01M 1/106 43/107 |
| 2005/0235554 | A1 * | 10/2005 | Uhl | A01M 23/08 43/107 |
| 2005/0279016 | A1 * | 12/2005 | Williams | A01M 1/14 43/107 |
| 2015/0000182 | A1 * | 1/2015 | Gomez | A01M 1/106 43/107 |
| 2018/0153153 | A1 * | 6/2018 | Widder | D04H 3/004 |
| 2020/0048801 | A1 * | 2/2020 | McCord | D04B 1/24 |

FOREIGN PATENT DOCUMENTS

| | | | | |
|---|---|---|---|---|
| CN | 107173353 A * | 9/2017 | | A01M 1/02 |
| CN | 108124839 A * | 6/2018 | | A01M 1/02 |
| CN | 108967390 A | 12/2018 | | |
| DE | 202018102974 U1 * | 9/2018 | | |
| DE | 202020002111 U1 * | 8/2020 | | A01M 1/02 |
| JP | 2000/159122 A | 6/2000 | | |
| KR | 2016/0124337 | 10/2016 | | |
| OA | 17063 | 9/2014 | | |
| WO | WO-2016036262 A1 * | 3/2016 | | A47C 29/006 |
| WO | WO-2017077161 A1 * | 5/2017 | | A01K 47/00 |
| WO | WO2021/026341 A1 | 2/2021 | | |

OTHER PUBLICATIONS

Merged translation of CN_107173353 (Year: 2017).*
Merged translation of CN_108124839 (Year: 2018).*
Merged translation of DE_202018102974 (Year: 2018).*
Merged translation of DE_202020002111 (Year: 2020).*
Merged translation of WO_2017077161 (Year: 2017).*
Parker, J.E., et al., "Infrared video tracking of Anopheles gambiae at insecticide-treated bed nets reveals rapid decisive impact after brief localised net contact", Sci Rep. 2015, vol. 1, No. 5, 2015, 14 pages.
Sutcliffe, J., et al., "How many holes is too many? A prototype tool for estimating mosquito entry risk into damaged bed nets", Malaria J., vol. 16, No. 304, 2017, 21 pages.
Office Action and Search received in ARIPO Patent Application No. AP/P/2022/013814 mailed on Feb. 7, 2024, 5 pages.
International Search Report and Written Opinion of the International Searching Authority Corresponding to International application No. PCT/US 2020/045184 dated Nov. 17, 2020.
International Preliminary Report on Patentability Corresponding to International application No. PCT/US 2020/045184 dated Feb. 17, 2022.

* cited by examiner

| VARIABLE | # OBS. | TOTAL CAUGHT | ENTRY # | | EXIT RATE (%) | | KILLING RATE (%) | |
|---|---|---|---|---|---|---|---|---|
| | | | MEAN* | STD DEV. | MEAN* | STD DEV. | MEAN* | STD DEV. |
| CONTROL | 14 | 53 | 3.8A | 3.0 | 77.2A | 29.4 | 14.4A | 18.0 |
| 200 | 14 | 139 | 9.9B | 10.2 | 47.3B | 27.8 | 39.1B | 30.6 |
| 300 | 14 | 175 | 12.5B | 10.6 | 45.7B | 30.6 | 39.9B | 26.1 |
| 400 | 14 | 156 | 11.1B | 8.3 | 26.8B | 20.7 | 61.9C | 22.1 |

*VALUES NOT SHARING THE SAME LETTERS ARE STATISTICALLY SIGNIFICANT
OBS.: NUMBER OF OBSERVATIONS
STD DEV.: STANDARD DEVIATION

FIG. 9

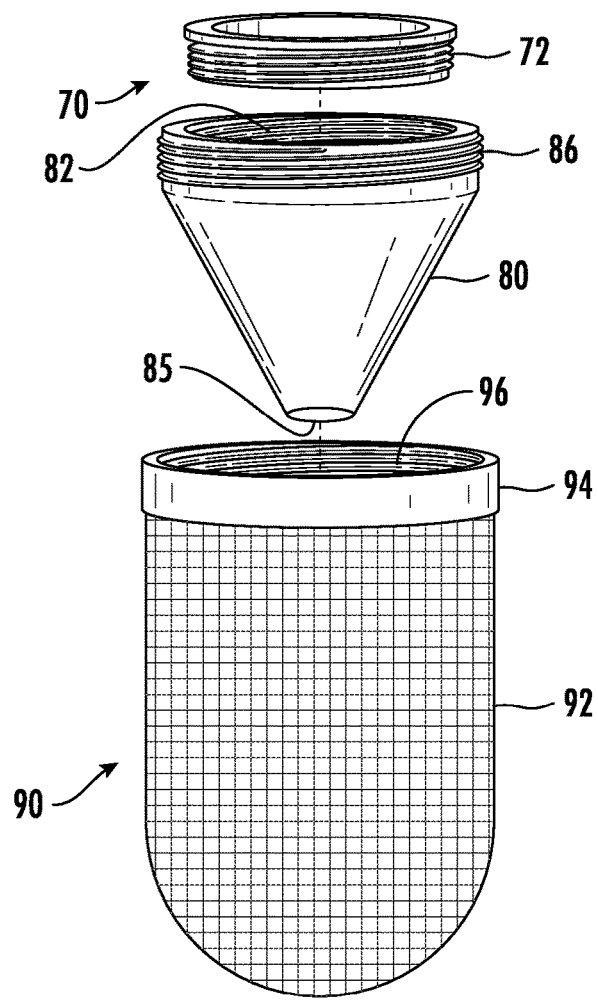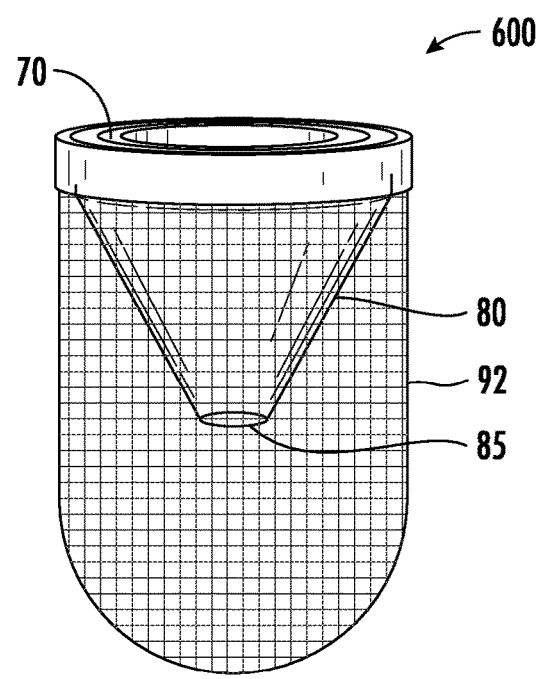
FIG. 13A
FIG. 13B

TRAPPING BED NET FOR MOSQUITO CONTROL

CROSS-REFERENCE TO RELATED APPLICATION

This application claims benefit of and priority to U.S. Provisional Patent Application Ser. No. 62/883,625, which was filed on Aug. 6, 2019, the disclosure of which is incorporated by reference herein in its entirety.

TECHNICAL FIELD

The presently disclosed subject matter relates to apparatuses and methods for preventing the spread of mosquito-transmitted diseases.

DETAILED DESCRIPTION

Malaria transmitted by mosquitos is the leading cause of morbidity and mortality for humans on a global basis, especially in sub-Saharan Africa, with 212 million cases estimated by the World Health Organization (WHO) and about 429,000 deaths each year from this disease. One major stride in malaria prevention has been the use of long-lasting insecticide treated nets (LLINs). Mosquitos land on the nets at night, a small amount of the insecticide transfers to the mosquito, and they die. About 50 million nets are sold each year in Africa and an estimated 663 million cases of malaria have been averted in sub-Saharan Africa since 2001 due to the increase in deployments of malaria control interventions. However, the successes gained with long-lasting pyrethroid treated bed-nets is now in jeopardy because of wide-spread, pyrethroid-resistance in mosquitos, and they are no longer effective in killing mosquitos. Malaria parasites have a complex life cycle, which presents a significant obstacle in the development of an effective vaccine. Developing a single new chemistry for these nets would cost 100 million dollars or more with no assurance of success or prevention of future resistance to the new insecticide.

Mosquitos that are resistant to insecticides, however, are not resistant to (e.g., remain susceptible to) trapping. Thus, there is an urgent need for developing less expensive devices and methods to avoid mosquito bites that do not require the use of chemical insecticides. The presently disclosed subject matter addresses these and other obstacles to preventing the transmission of many commonly mosquito-borne diseases.

SUMMARY

Accordingly, it is an object of the presently disclosed subject matter to provide apparatuses and methods for trapping and killing mosquitos. This and other objects are achieved in whole or in part by the presently disclosed subject matter.

An insecticide-free trapping net with two compartments is provided herein, this net including a lower sleeping, or occupant, chamber and an upper mosquito trap chamber containing cone-like funnels as mosquito entry points into the trap chamber. 3-D knitting may be used for cone construction.

The subject matter disclosed herein prevents mosquitos from biting people while they sleep, thus reducing the spread of mosquito-borne illnesses. The disclosed subject matter also kills mosquitos without chemicals with a high efficiency rate compared to conventional mosquito nets with insecticides added to the net by any method.

A trapping bed net, referred to as a "T-Net", is disclosed herein. The T-Net is used to control mosquitos by collecting them in a trap chamber each night, where they die in a few hours from desiccation and or starvation. Because there is no new chemistry to develop, the route to market is rapid and the cost for product development minimal. An aspect of the device is a cone, particularly cone (a fabric or knitted cone, plastic cone, paper cone, or any other material-made cone) which enhances trap efficacy and prevents mosquitos from escaping the trap. The presently disclosed subject matter also includes the use of any fabric type irrespective of the method used to make the fabric, for example a weave versus a knit, any other material used, for example plastic, paper, carbon fiber, etc., and any shape in addition to the shape of a cone, where the shape increases the probability of the mosquito entering into the trap chamber but reduces the probability of the mosquito leaving the trap chamber once in the trap. The trap chamber is defined as any space of textile construction but is not limited and could be made of other materials like plastics, paper, etc. that, once the mosquitos are in the trap, they cannot exit the trap and will die from starvation.

It is to be further understood that although the net disclosed herein is referred to as a "bed net", the mosquito trapping net can be used in a variety of applications, such as eating, working, playing, etc., and the term "bed" should not be construed as limiting.

An object of the presently disclosed subject matter having been stated above, other objects and advantages of the presently disclosed subject matter will become apparent to those of ordinary skill in the art after a study of the following description of the presently disclosed subject matter and non-limiting figures, which form part of the instant disclosure.

BRIEF DESCRIPTION OF THE DRAWINGS

FIG. 9 is a table of data for a control mosquito net and the example embodiments of the nets shown in FIGS. 2A-4B.

FIG. 13A is an exploded view of an example embodiment of a kit of parts for converting a conventional mosquito control net into a trapping mosquito control net.

FIG. 13B is an assembled view of the kit of parts of FIG. 13A.

DETAILED DESCRIPTION

Figure 1:
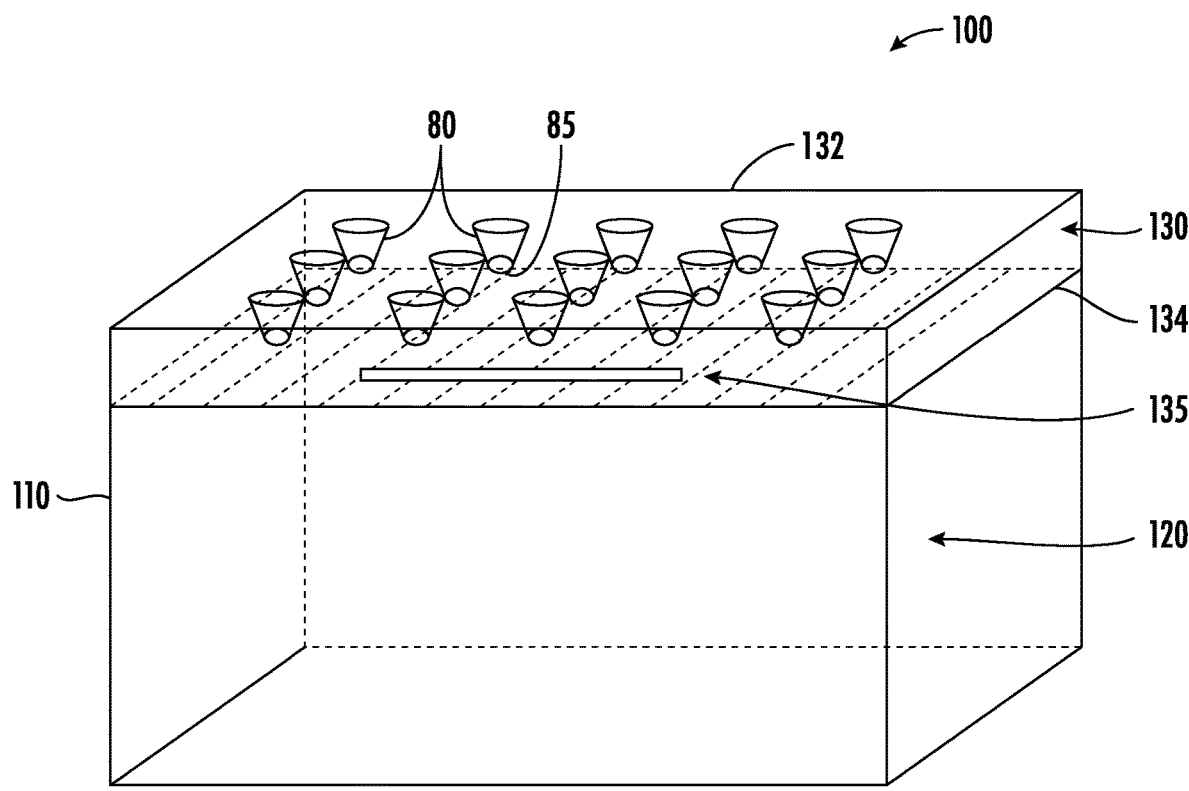
FIG. 1 is a schematic isometric view of an example embodiment of a net for trapping mosquitos to prevent an occupant within the net from being bitten by one or more mosquitos.

Mosquitos are attracted to carbon dioxide and other human odors. These odorants emitted from the body are warmer than ambient air and rise from its source. About 75% of mosquitoes follow this odorant plume and are attracted to the top surface of a net in use (e.g., installed in position over a sleep surface, such as a bed). As such, an insecticide-free trapping net with two compartments is provided herein, this net including a lower sleeping, or occupant, chamber and an upper mosquito trap chamber containing cone-like funnels as mosquito entry points into the trap chamber. 3-D knitting may be used for cone construction. Proof of concept was investigated in the laboratory and then under field conditions with wild-type, resistant *An. gambiae* mosquitoes in Tiassale, Côte d'Ivoire (Africa), data of which is shown in FIGS. 8A-12.

The presently disclosed subject matter will now be described more fully hereinafter with reference to the accompanying figures, in which representative example embodiments are shown. The presently disclosed subject matter can, however, be embodied in different forms and should not be construed as being limited to the embodiments set forth herein. Rather, these embodiments are provided as examples so that this disclosure will be thorough and complete, and will fully convey the scope of the embodiments to those skilled in the art. Certain components in the Figures and Examples are not necessarily to scale, emphasis instead being placed upon illustrating the principles of the presently disclosed subject matter (in some cases schematically).

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

While the following terms are believed to be well understood by one of ordinary skill in the art, the following definitions are set forth to facilitate explanation of the presently claimed subject matter.

Following long-standing patent law convention, the terms "a", "an", and "the" refer to "one or more" when used herein, including in the claims.

As used herein, the term "about", when referring to a value or an amount, for example, relative to another measure, is meant to encompass variations of in some embodiments ±20%, in some embodiments ±10%, in some embodiments ±5%, in some embodiments ±1%, and in some embodiments ±0.1% from the specified value or amount, as such variations are appropriate. The term "about" can be applied to all values set forth herein.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, "significance" or "significant" relates to a statistical analysis of the probability that there is a non-random association between two or more entities. To determine whether or not a relationship is "significant" or has "significance", statistical manipulations of the data can be performed to calculate a probability, expressed in some embodiments as a "p-value". Those p-values that fall below a user-defined cutoff point are regarded as significant. In some embodiments, a p-value less than or equal to 0.05, in some embodiments less than 0.01, in some embodiments less than 0.005, and in some embodiments less than 0.001, are regarded as significant.

In some embodiments, the subject treated according to the presently disclosed subject matter is a human subject, although it is to be understood that the methods described herein are effective with respect to all mammals. More particularly, provided herein is the treatment of mammals, such as humans, as well as those mammals of importance due to being endangered (e.g., Siberian tigers), of economic importance (animals raised on farms for consumption or another use, such as the production of wool, by humans) and/or social importance (animals kept as pets or in zoos) to humans, for instance, carnivores other than humans (e.g., cats and dogs), swine (e.g., pigs, hogs, and wild boars), ruminants (e.g., cattle, oxen, sheep, giraffes, deer, goats, bison, and camels), and horses. Thus, embodiments of the systems and methods described herein include the treatment of livestock and pets.

A first example embodiment of a mosquito control net, generally designated 100, is shown in FIG. 1. The net 100 has an occupant chamber, generally designated 120, and a trap chamber, generally designated 130. The trap chamber 130 has one or more openings in an outer (e.g., top, or upper) surface 132 of the trap chamber 130 and/or the net 100. The trap chamber 130 is separated from the occupant chamber 120 by a barrier layer 134, which is made from a textile material that mosquitos cannot pass through, such that mosquitos within the trap chamber 130 cannot pass into the occupant chamber 120 through the barrier layer 134. In this embodiment, the net 100 comprises an outer shell 110 forming an exterior of both the trap chamber 130 and the occupant chamber 120. As such, the trap chamber 130 is integrated, along with the occupant chamber 120, into the outer shell 110. As such, the barrier layer 134 extends in the form of a substantially continuous and uninterrupted layer between the lateral sides and/or surfaces of the outer shell 110 to define the occupant chamber 120 and the trap chamber 130. In some embodiments, part or all of the textile material used to construct at least the portion of the outer shell 110 defining the occupant chamber 120 and/or the barrier layer 134 can be made of a three-dimensional "spacer fabric" (e.g., a fabric having two layers separated by an inner spacing material, in the manner of a sandwich construction.)

The openings are formed in the outer surface 132 of the trap chamber 130, which entirely covers the barrier layer 134, which can also be referred to as an inner layer of the occupant chamber 120. In some embodiments, the outer surface 132 of the trap chamber 130 can only partially cover the barrier layer 134. In some embodiments, the trap chamber 130 can be disposed partially or entirely over one or more sides of the occupant chamber 120, for example, such that all or some of the outer walls of the outer shell 110 comprise at least a portion of one or more trap chambers 130. In some such embodiments, the barrier layer 134 can extend in both the vertical and/or horizontal directions, as necessary, to create a barrier that is impermeable to mosquitos between the trap chamber 130 and the occupant chamber 120.

The openings formed in the outer surface 132 of the trap chamber 130 can take a number of forms, such as, for example, holes formed or cut into the textile material that forms the outer surface 132. In some embodiments, the openings formed in the outer surface 132 are a textile material that is more coarsely woven (e.g., has larger voids in the weave pattern) than the textile material that forms the outer shell 110, the textile material that is more coarsely woven being sewn into the textile material that is more finely woven to allow mosquitos to pass through the textile material that is more coarsely woven. In some embodiments, the textile material of at least the outer surface 134 is woven such that voids in the weave pattern are large enough for a mosquito to pass through in a first direction (e.g., towards the interior of the trap chamber 130), but small enough to prevent the mosquito passing therethrough in a second direction, opposite the first direction (e.g., away from the interior of the trap chamber 130). At least the portions of the outer shell 110 defining the occupant chamber 120 are made from a breathable textile material (e.g., a woven fabric with holes that are too small for mosquitos to pass through).

Figure 5:
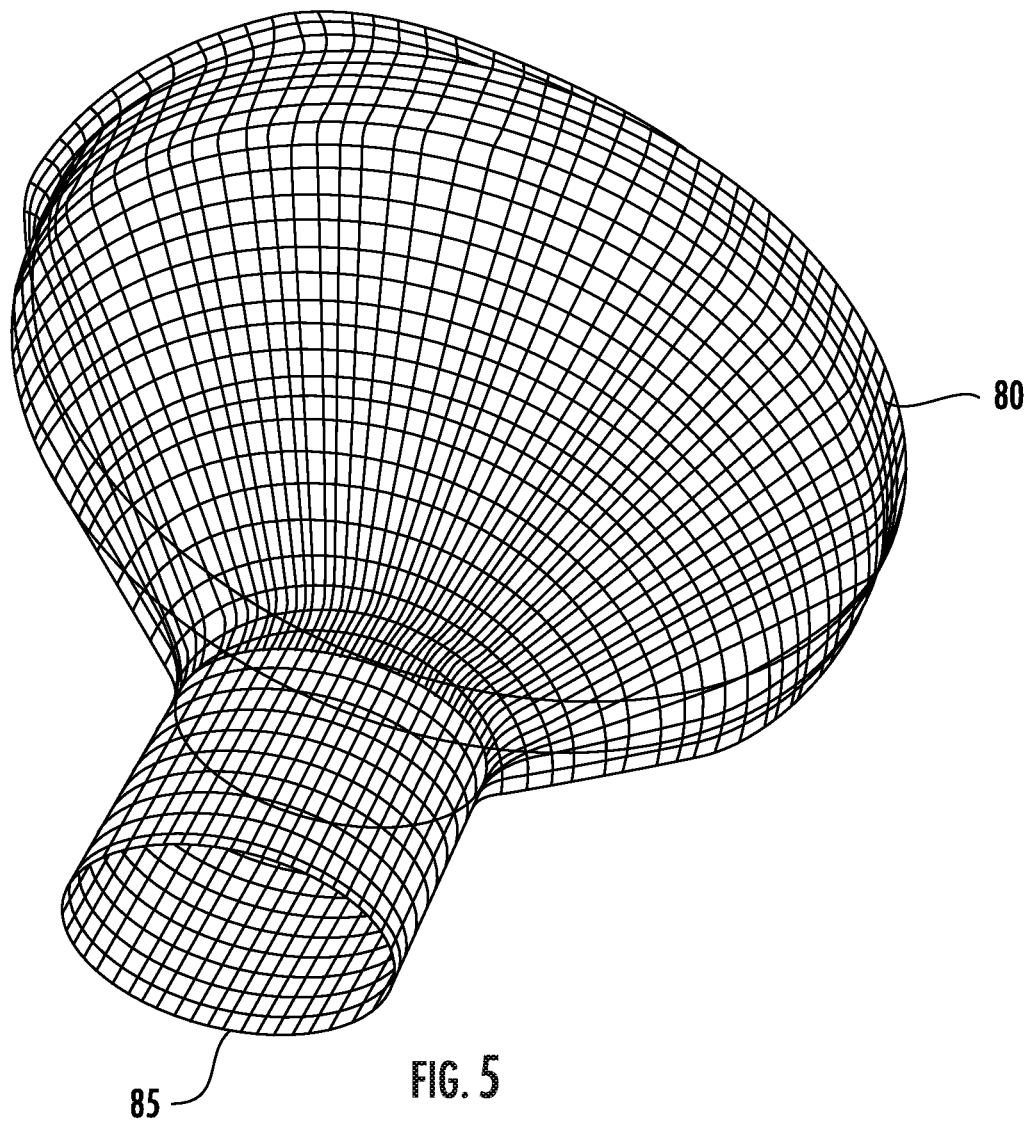
FIG. 5 is an isolated perspective view of an example embodiment of a woven or mesh conical structure suitable for use in any of the example embodiments of the nets disclosed in FIGS. 1-4B.

In the example embodiment shown in FIG. 1, the openings are three-dimensional receptacles 80 having a generally conical shape, however, in some embodiments, the receptacles 80 can have square, rectangular, hemispherical, triangular, or any other suitable shape(s). An example and non-limiting embodiment of a receptacle 80 that tapers towards the mouth 85 of the receptacle 80 is shown in FIG. 5 and is in the shape of, and acts similarly to, a funnel and can be made from any suitable material. In the embodiment shown in FIG. 5, the receptacle 80 is made of a woven material. Receptacles 80 each comprise a mouth 85. The net 100 and/or portions thereof, such as, for example, the trap chamber 130 can be made from fiber or yarn used in conventional nets and/or any other suitable material, fiber or yarn. Materials can include, for example, woven, non-woven, braid, netting, and lace fabrics, as well as "formed" (i.e., monolithic) material, such as, but not limited to, a plastic material.

Figure 2A:
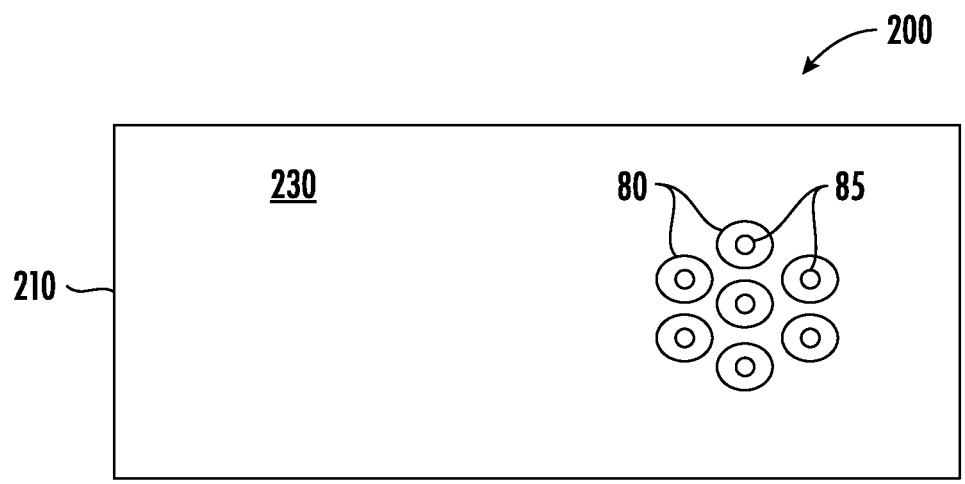
FIG. 2A is a schematic top view of another example embodiment of a net for trapping mosquitos to prevent an occupant within the net from being bitten by one or more mosquitos.
Figure 2B:
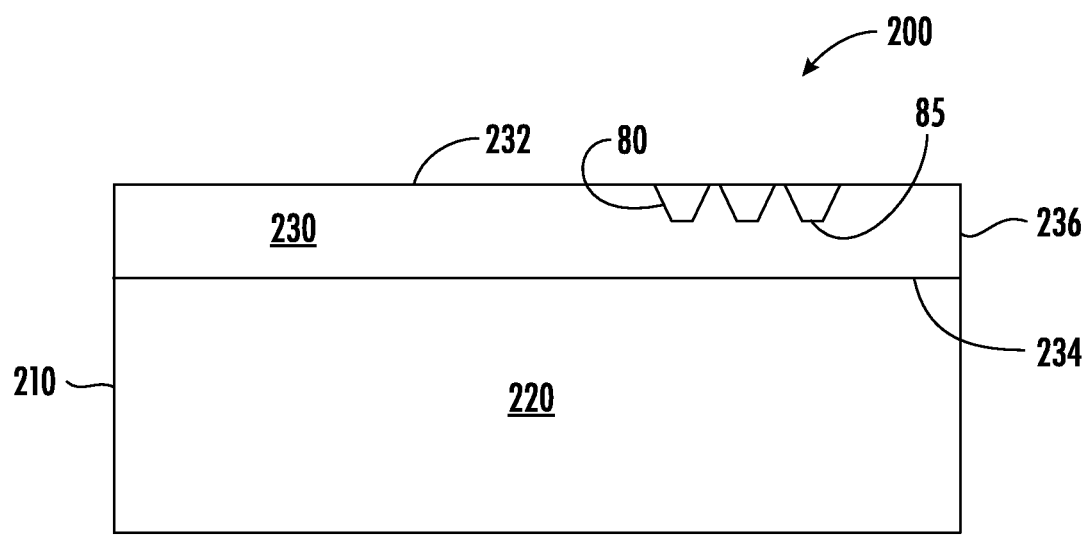
FIG. 2B is a schematic side view of the example embodiment shown in FIG. 2A.

A second example embodiment of a mosquito control net, generally designated 200, is shown in FIGS. 2A and 2B. The net 200 has an occupant chamber, generally designated 220, a trap chamber, generally designated 230, and walls 236. The trap chamber 230 has one or more (e.g., a plurality of) openings in an outer (e.g., top, or upper) surface 232 of the trap chamber 230 and/or the net 200. The trap chamber 230 is separated from the occupant chamber 220 by a barrier layer 234, which is made from a textile material that mosquitos cannot pass through, such that mosquitos within the trap chamber 230 cannot pass into the occupant chamber 220 through the barrier layer 234. In this embodiment, the net 200 comprises an outer shell 210 forming an exterior of both the trap chamber 230 and the occupant chamber 220. As such, the trap chamber 230 is integrated, along with the occupant chamber 220, into the outer shell 210. As such, the barrier layer 234 extends in the form of a substantially continuous and uninterrupted layer between the lateral sides and/or surfaces of the outer shell 210 to define the occupant chamber 220 and the trap chamber 230. In some embodiments, part or all of the textile material used to construct at least the portion of the outer shell 210 defining the occupant chamber 220 and/or the barrier layer 234 can be made of a three-dimensional "spacer fabric" (e.g., a fabric having two layers separated by an inner spacing material, in the manner of a sandwich construction.)

The openings are formed in the outer surface 232 of the trap chamber 230, which entirely covers the barrier layer 234, which can also be referred to as an inner layer of the occupant chamber 220. The openings in the outer surface 232 are grouped in a region of the net 200 corresponding to the position at which a user's head is positioned while sleeping within the net 200. The attraction of mosquitos through the receptacles 80 into the trap chamber 230 is a result of attraction of the mosquitos to carbon dioxide and other odors from human respiration. As such, in this example embodiment, receptacles 80 were only positioned on the head end of the net 200 with a circular aggregate of 7 frustoconically-shaped receptacles 80 spaced about 30 cm from the end of the net 200. By way of example and not limitation, each receptacle has a 10 cm diameter inlet, an 8 cm depth, and a 1.8 cm diameter exit, or outlet, as measured at the cross-section of the mouth 85. The receptacles 80 were attached around the midline of the long axis of the outer surface 232 of the trap compartment 230, which has an exemplary, but non-limiting, depth of 25 cm.

Figure 3A:
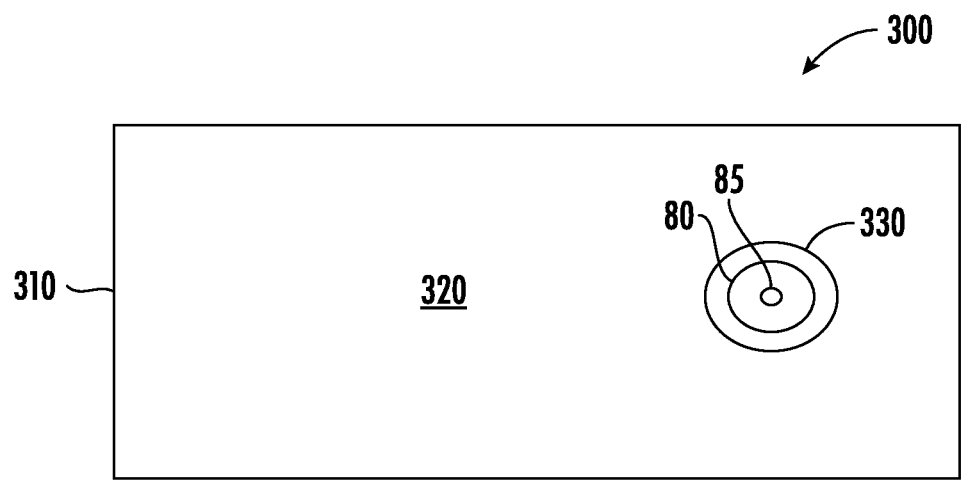
FIG. 3A is a schematic top view of another example embodiment of a net for trapping mosquitos to prevent an occupant within the net from being bitten by one or more mosquitos.
Figure 3B:
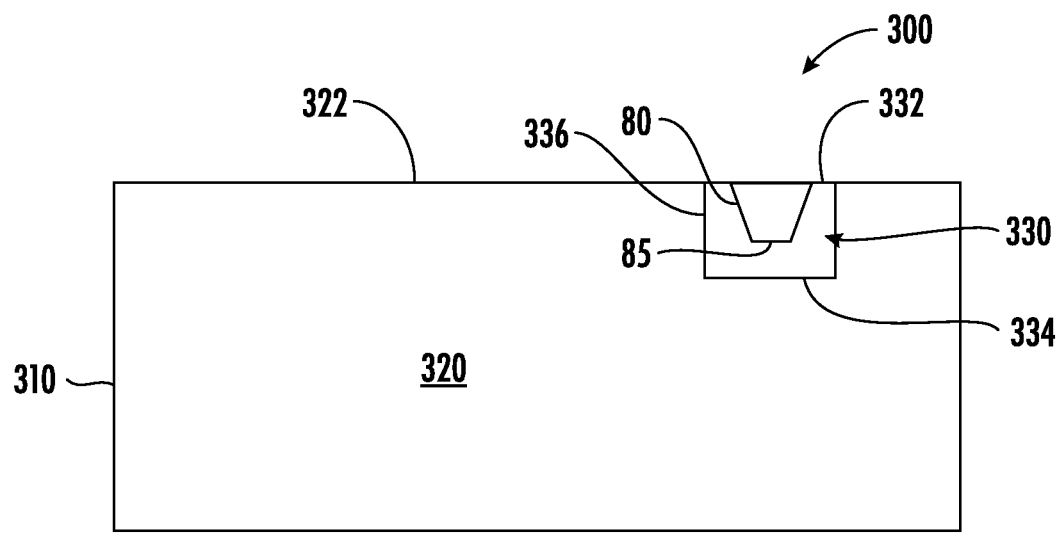
FIG. 3B is a schematic side view of the example embodiment shown in FIG. 3A.

A third example embodiment of a mosquito control net, generally designated 300, is shown in FIGS. 3A and 3B. The net 300 has an occupant chamber, generally designated 320, a trap chamber, generally designated 330, and an upper wall 322. In this embodiment, the net 300 comprises an outer shell 310 forming an exterior of both the trap chamber 330 and the occupant chamber 320. As such, the trap chamber 330 is integrated, along with the occupant chamber 320, into the outer shell 310. As such, the barrier layer 334 extends in the form of a substantially continuous and uninterrupted layer between the lateral sides and/or surfaces of the outer shell 310 to define the occupant chamber 320 and the trap chamber 330. In some embodiments, part or all of the textile material used to construct at least the portion of the outer shell 310 defining the occupant chamber 320 and/or the barrier layer 334 can be made of a three-dimensional "spacer fabric" (e.g., a fabric having two layers separated by an inner spacing material, in the manner of a sandwich construction.)

The net 300 has openings formed in the outer surface 332 of the trap chamber 330, which entirely covers the barrier layer 334, which can also be referred to as an inner layer of the occupant chamber 320. To investigate increasing the trapping rate and add additional functionality, the net 300 has only a single large conically-shaped receptacle 80, which, by way of example and not limitation, has a 15 cm diameter inlet, a depth of 12 cm, and a 3 cm diameter exit, or outlet, as measured at the cross-section of the mouth 85. As shown in FIGS. 3A and 3B, the receptacle 80 is attached to the outer surface 332 to extend within a trap chamber 330, which is in the form of a cylindrically-shaped bag have an exemplary, but non-limiting, depth of 25 cm, as measured from the outer surface 332 to the bottom surface 334, and an exemplary, but non-limiting, diameter of 25 cm, as measured between opposing sides of the wall 336. By way of example and not limitation, a trap chamber 330 is attached on the outer surface 332 of the net 30 cm from the longitudinal edge of the net 300. The construction and configuration of the net 300 is advantageous in reducing material costs for construction and allowing for the head space between the sleeper and outer surface 332 of the net 300, so as to effectively increase the odorant concentration on the top of the net, as well as adding practical functionality to the bed net design. The design of the net 300 could advantageously be used to retrofit any conventional net, including those already deployed in homes.

Figure 4A:
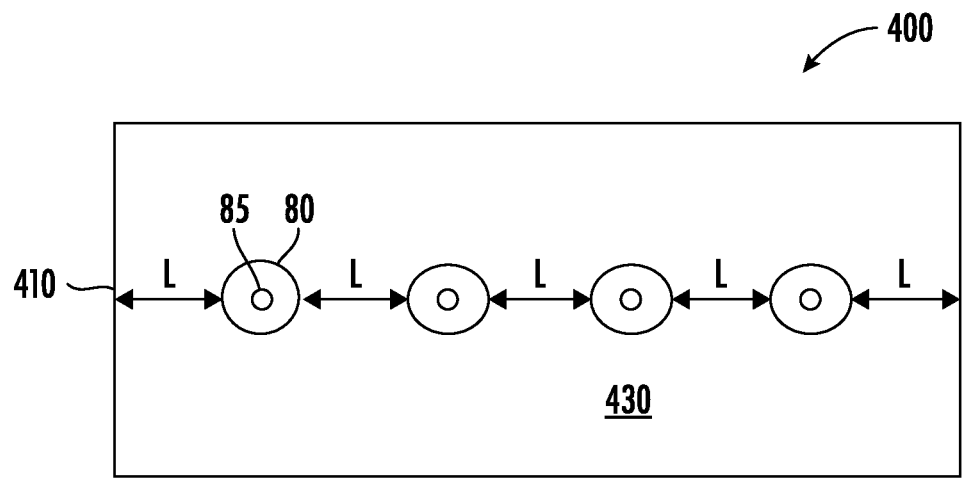
FIG. 4A is a schematic top view of another example embodiment of a net for trapping mosquitos to prevent an occupant within the net from being bitten by one or more mosquitos.
Figure 4B:
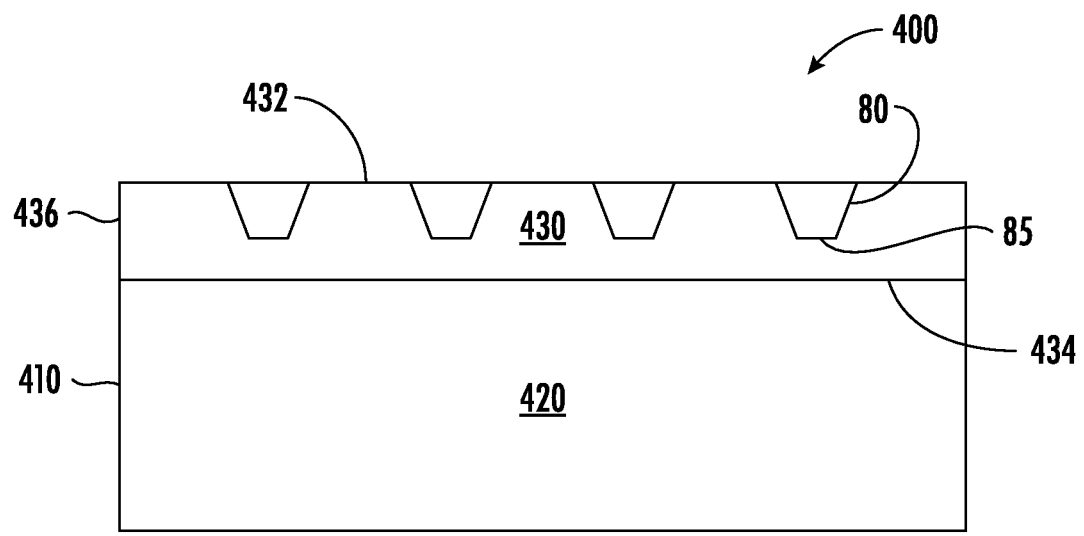
FIG. 4B is a schematic side view of the example embodiment shown in FIG. 4A.

A fourth example embodiment of a mosquito control net, generally designated 400, is shown in FIGS. 4A and 4B. The net 400 has an occupant chamber, generally designated 420, a trap chamber, generally designated 430, and walls 436. The trap chamber 430 has one or more (e.g., a plurality of) openings in an outer (e.g., top, or upper) surface 432 of the trap chamber 430 and/or the net 400. The trap chamber 430 is separated from the occupant chamber 420 by a barrier layer 434, which is made from a textile material that mosquitos cannot pass through, such that mosquitos within the trap chamber 430 cannot pass into the occupant chamber 420 through the barrier layer 434. In this embodiment, the net 400 comprises an outer shell 410 forming an exterior of both the trap chamber 430 and the occupant chamber 420. As such, the trap chamber 430 is integrated, along with the occupant chamber 420, into the outer shell 410. As such, the barrier layer 434 extends in the form of a substantially continuous and uninterrupted layer between the lateral sides and/or surfaces of the outer shell 410 to define the occupant chamber 420 and the trap chamber 430. In some embodiments, part or all of the textile material used to construct at least the portion of the outer shell 410 defining the occupant chamber 420 and/or the barrier layer 434 can be made of a three-dimensional "spacer fabric" (e.g., a fabric having two layers separated by an inner spacing material, in the manner of a sandwich construction.)

The openings are formed in the outer surface 432 of the trap chamber 430, which entirely covers the barrier layer 434, which can also be referred to as an inner layer of the occupant chamber 420. To investigate the relationship between catch rate and the rate of egression from the trap chamber 430, the net 400 has a plurality of (e.g., four) conically-shaped receptacles 80, each of which has an exemplary, but non-limiting, 15 cm diameter inlet, an exemplary, but non-limiting, depth of 12 cm, and an exemplary, but non-limiting, 3 cm diameter exit, or outlet, as measured at the cross-section of the mouth 85. As shown in FIGS. 4A and 4B, each of the receptacles 80 is attached to the outer surface 432 to extend within the trap chamber 430, which is generally in the form of a rectangular prism having an exemplary, but non-limiting, depth of 25 cm, as measured between the outer surface 432 and the barrier layer 434. The receptacles are spaced substantially equidistantly and/or uniformly away from each other and the edges of the net 400, such that the receptacles are spaced apart by a length L (e.g., 26 cm) and arranged lengthwise along the centerline of the net 400.

Figure 8A:
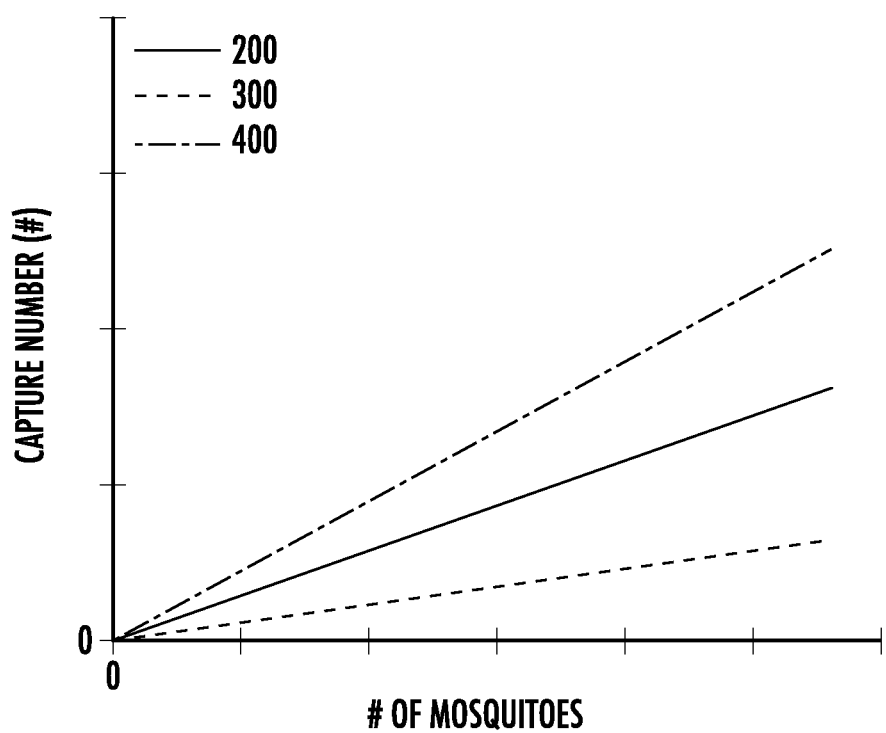
FIG. 8A is a plot of the number of mosquitos captured as a function of the number of mosquitos present for the example embodiments of the nets shown in FIGS. 2A-4B.
Figure 8B:
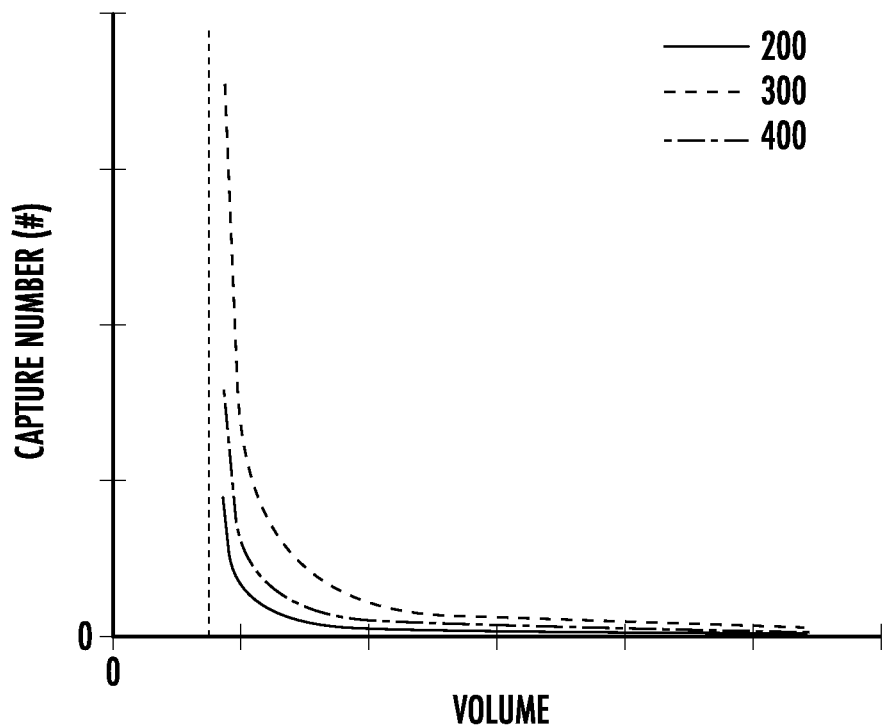
FIG. 8B is a plot of the number of mosquitos captured as a function of the surrounding volume throughout which the mosquitos are dispersed for the example embodiments of the nets shown in FIGS. 2A-4B.

The efficacy of the nets 200, 300, 400 was modeled to predict trapping rates, which are shown by the regression curves in FIGS. 8A and 8B. FIG. 8A shows a plot of the capture rate of the nets 200, 300, 400, as a function of mosquitos entering a constant volume in which the nets 200, 300, 400 are installed with a human positioned within the nets 200, 300, 400. It can be seen that the net 400 has the best capture rate, followed by net 200, with net 300 having the lowest capture rate. FIG. 8B shows a plot of the capture rate of the nets 200, 300, 400, as a function of a constant number of mosquitos being present within a space having a variable volume, in which the nets 200, 300, 400 are installed with a human positioned within the nets 200, 300, 400. It can be seen that, while the capture rate for all of the nets increases drastically as a function of the volume of the area in which the nets 200, 300, 400 are installed, the net 300 has the best capture rate, followed by net 400, with net 200 having the lowest capture rate.

In order to validate the results of the nets 200, 300, 400, field trials were conducted, in which the efficacy of the nets 200, 300, 400 was compared against that of a conventional net, a Permanent 2.0 LLIN, which is the most used LLIN in Africa. These field trials were conducted in WHO-approved experimental huts (see, e.g., FIG. 6A) in the locality of Tiassale, wherein wild *An. gambiae* malaria-bearing mosquitos are insecticide-resistant, with human subjects sleeping under the control net and the nets 200, 300, 400 each night. The estimated flight of a mosquito within such a hut is shown in FIG. 6B. The data obtained during these field trials is shown in FIG. 9.

Figure 10A:
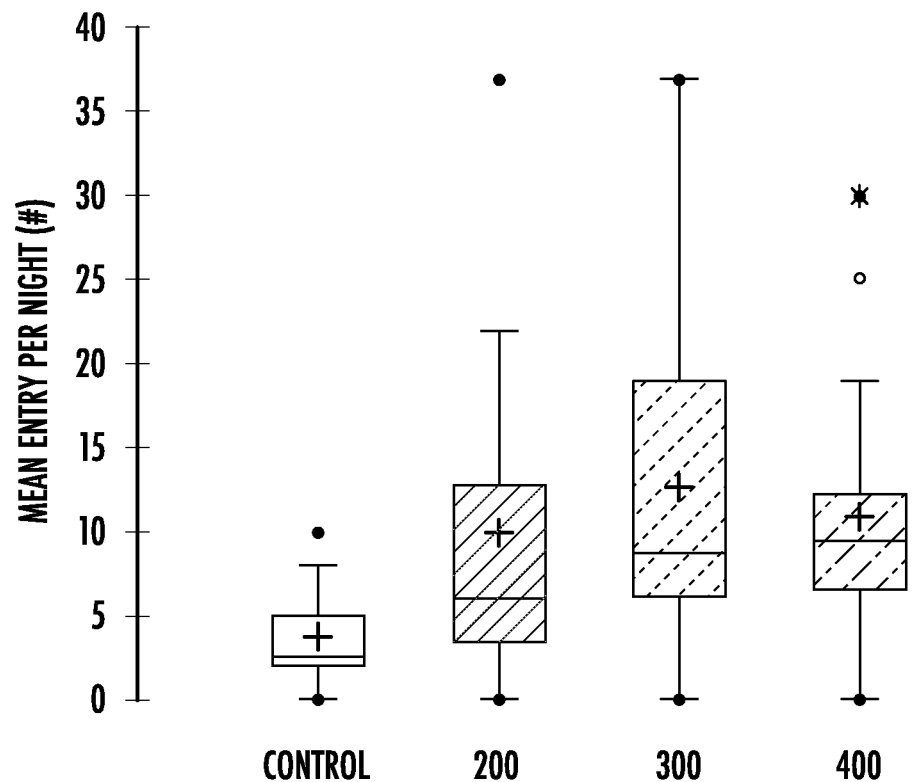
FIG. 10A is a plot of the mean entry rate of mosquitos into the example sleeping unit of FIG. 6A, in which one of the nets shown in FIGS. 2A-4B, or a control net, were positioned with a human being present within each net.

The mean entry number was recorded and is shown in FIG. 10A. A total of 53, 139, 175 and 156 *An. gambiae* sl mosquitoes were collected over 14 nights (representing 14 observations=14 replicates), respectively, for the control, net 200, net 300, and net 400. The mean number of mosquitos entering each hut per night was 3.8 ($\sigma$=2.96) for the control net, the lowest entry rate in the field trial, followed by 9.9 ($\sigma$=10.1) for the net 200, 12.5 ($\sigma$=10.5) for the net 300, and 11.1 ($\sigma$=8.3) for the net 400. The differences were not statistically significant between the nets 200, 300, 400, but a significant difference was observed between the control net and each of the nets 200, 300, 400 ($P<0.05$).

Figure 10B:
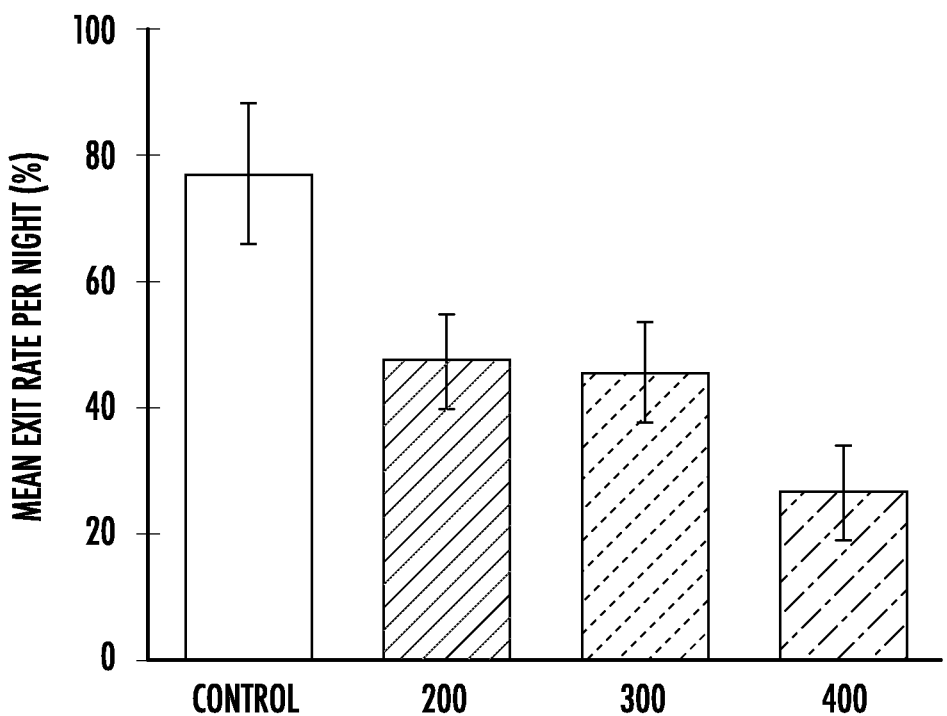
FIG. 10B is a plot of the mean exit rate of mosquitos from the example sleeping unit of FIG. 6A, in which one of the nets shown in FIGS. 2A-4B, or a control net, were positioned with a human being present within each net.

The mean exit rate was recorded and is shown in FIG. 10B. The control net not only showed the lowest entry rate but also the highest mean exit rate of mosquitos per night, 77.2% ($\sigma$=29.4) and was statistically significantly different from that of the nets 200, 300, 400. In nets 200, 300, a mean mosquito exit rate per night of 47.3% ($\sigma$=27.7) and 45.7% ($\sigma$=30.6), respectively, were recorded. In net 400, a mean mosquito exit rate of 26.7% ($\sigma$=20.7) was recorded, which was the lowest mean exit rate. No statistically significant differences in exit rates was observed between the three nets 200, 300, 400.

Figure 10C:
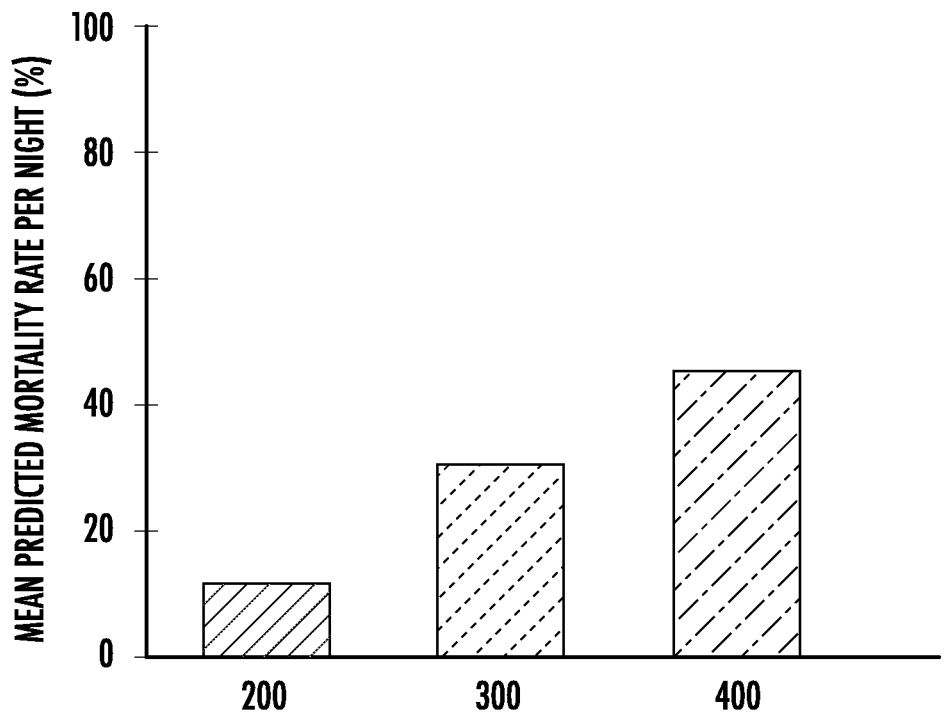
FIG. 10C is a plot of the mean predicted mortality rate of mosquitos for each of the example embodiments of the nets shown in FIGS. 2A-4B, which were each installed within an example sleeping unit of FIG. 6A and had a human present within each net.
Figure 10D:
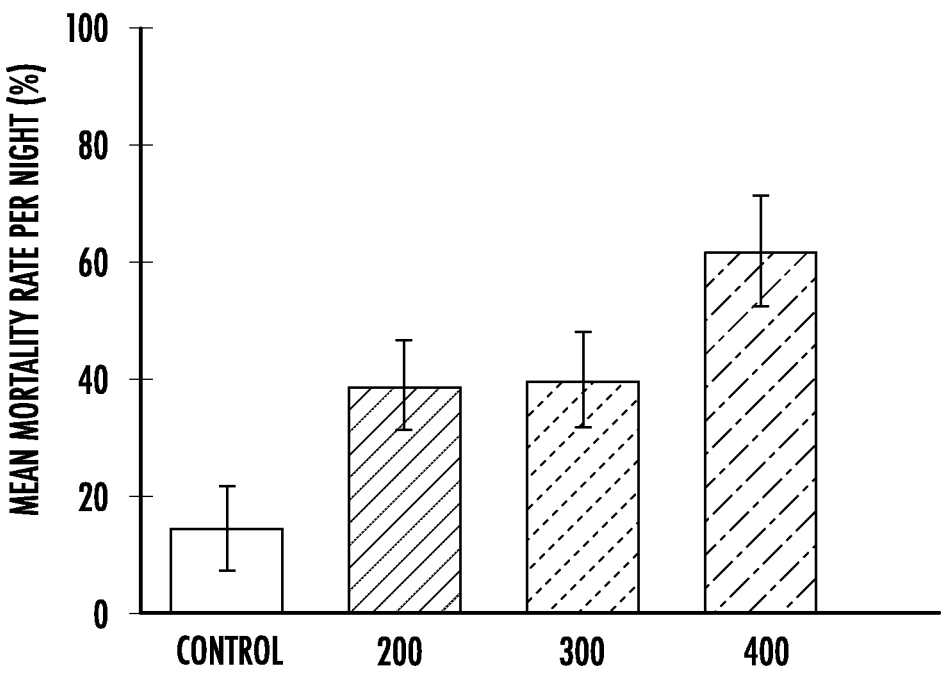
FIG. 10D is a plot of the mean actual mortality rate of mosquitos for each of the example embodiments of a control net and the nets shown in FIGS. 2A-4B, which were installed each within an example sleeping unit of FIG. 6A and had a human present within each net.

The mean mortality rate was also recorded and is shown in FIG. 10D. The lowest mortality rate was recorded with the control net, 14.3% ($\sigma$=17.9). The mean mortality rate of the control net was statistically significantly lower than for all of the nets 200, 300, 400. The mortality rates for the nets 200, 300 were 39.1% ($\sigma$=30.5) and 39.8% ($\sigma$=26.0), respectively, with no statistical significant differences between these two nets ($P>0.05$). The highest mean mosquito mortality rate per hut per night was for the net 400 at 61.9% ($\sigma$=22.1). This difference was higher than that of the nets 200, 300, and the control net ($P<0.05$).

The mean mortality rate for the nets 200, 300, 400 were predicted and are shown in FIG. 10C. It was predicted that the trap number for nets 200, 300, 400, respectively, at 2.87, 1.41 and 5.02 corresponding to trapping rates of 28.9%, 11.3% and 45.06%. The relative trap efficiency between nets 200, 300, 400 predicted was in agreement but underestimated the actual trap efficacy in the field trials, shown in FIG. 10D. This was expected since the predicted data did not take into consideration the attractants from the sleeper within the occupant chamber of the net. For the net 200, there was a much greater trap rate than predicted, suggesting that receptacle positioning above the sleeper head likely is responsible for a greater number of trapped mosquitoes than the other receptacles in the net 400. At the same time, the higher efficacy of the net 400 where the receptacles run along the long top axis of the net 400 confirms that odorants from other parts of the body increase trap efficacy.

Figure 11A:
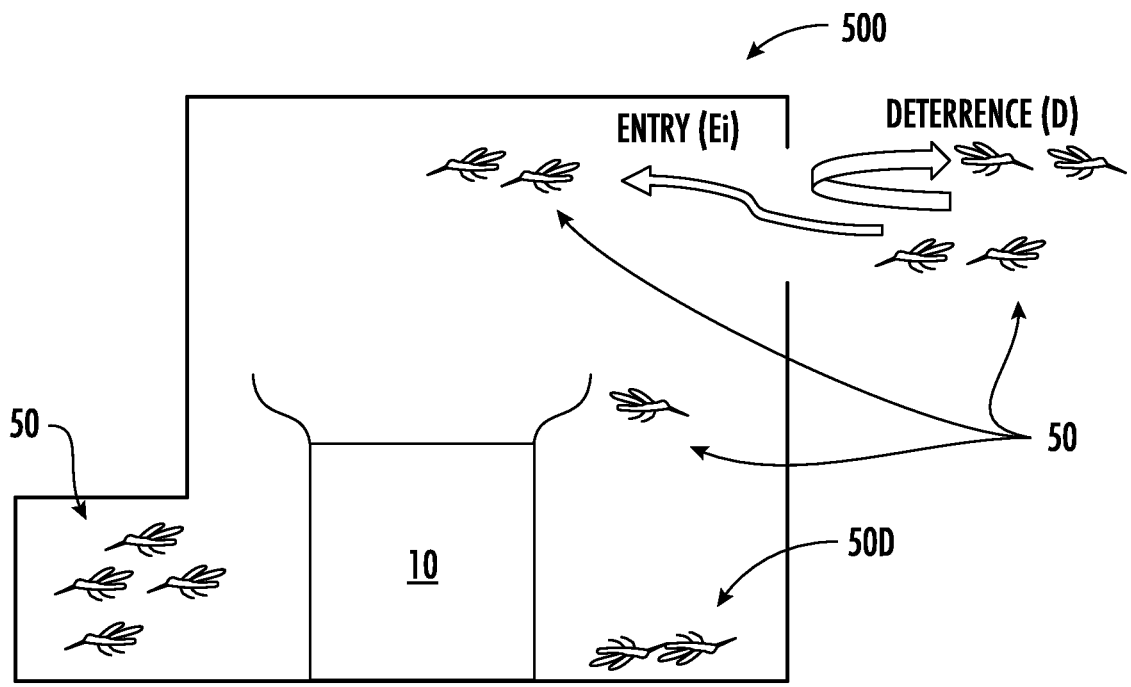
FIG. 11A is a schematic side view of a sleeping unit of FIG. 6A, in which a conventional mosquito control net known from the prior art is installed.

The nets 200, 300 had a 2.7-times (sometimes referred to as a "fold" increase) greater kill rate than the control net, while the net 400 had a 4.3-times greater kill rate than the control net. However, there is more to consider in comparing these different bed net technologies and the impact on mosquito mortality in the community for the nets 200, 300, 400 is actually much greater than shown by these data. The deterrence rate was much lower and the repellency rate much higher for the control net compared to any of the nets 200, 300, 400. FIG. 11A is a schematic side view of a conventional mosquito control net 10, which has an insecticide applied thereto and is installed within an example residential unit, generally designated 500. As shown in FIG. 11A, if the mosquitos do not enter the hut because of deterrence due to the presence of the insecticide on the control net and/or if the mosquitos enter the hut but are repelled before receiving a lethal insecticide dose from the control net, these mosquitoes are not being controlled in the community at large, as they have not been neutralized and remain alive to circulate through the community.

Figure 11B:
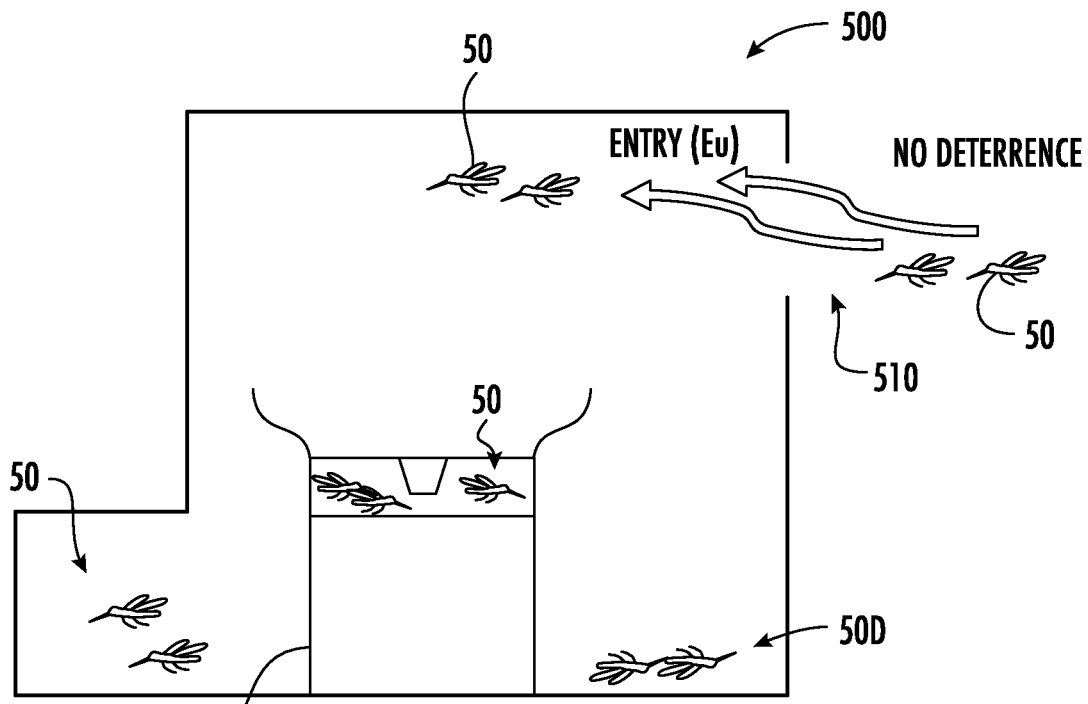
FIG. 11B is a schematic side view of a sleeping unit of FIG. 6A, in which a mosquito control net according to one of the example embodiments shown in FIGS. 1-4B is installed.
Figure 12:
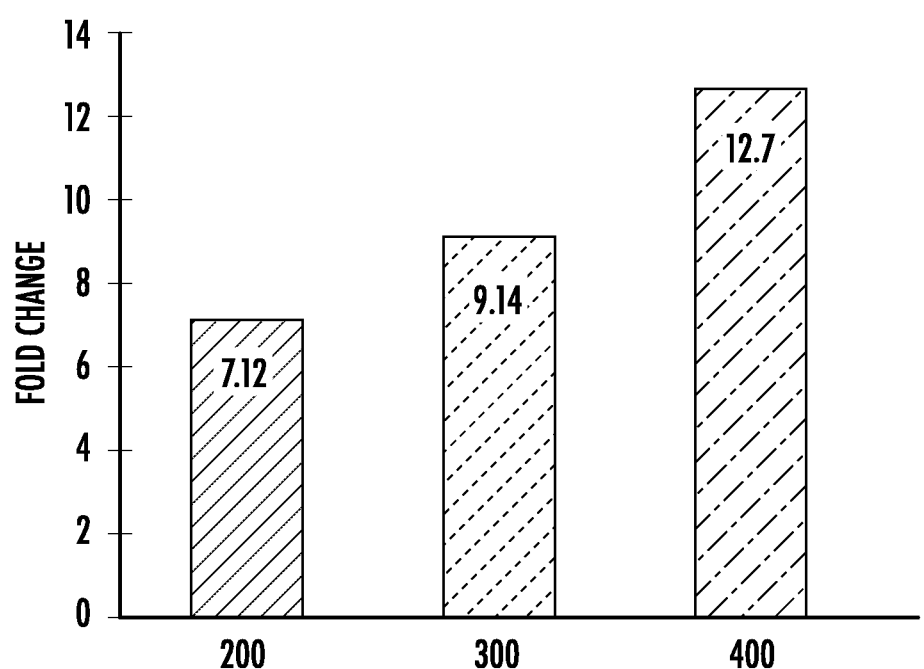
FIG. 12 is a plot showing the increase in mosquito mortality for the mosquito control nets shown in FIGS. 2A-4B, plotted as a multiple of the increase over the mosquito control provided by a conventional mosquito control net known from the prior art.

FIG. 11B is a schematic side view of a net 100, 200, 300, 400, which is devoid of any insecticide and is installed within a substantially identical example residential unit 500 as is shown in FIG. 11A. As shown in FIG. 11B, mosquitos 50 enter the residential unit through an entryway, generally designated 510, such as a window or doorway that is at least partially open, or ajar. Unlike in FIG. 11A, in which at least some proportion of mosquitos 50 are deterred from entering the residential unit 500 through the entryway 510 due to the presence of the insecticide on the conventional mosquito control net 10 and remain able to circulate in the community, in FIG. 11B there is no insecticide present and, as such, no deterrence to the entry of the mosquitos 50 through the entryway 510, even for mosquitos 50 that are insecticide-resistant. As such, unlike in FIG. 11A, in FIG. 11B approximately all of the mosquitos who attempt to enter the residential unit 500 through the entryway 510 do actually enter the residential unit 500 and substantially no mosquitos are deterred from entering (e.g., by the presence of insecticide). As can be seen in FIG. 11B, live mosquitos are able to circulate within the residential unit 500, external to the net 100, 200, 300, 400. Because of their inability to successfully feed from a host, some mosquitos (e.g., dead mosquitos 50D) will die within the residential unit as a result of their inability to reliably locate the entryway 510 for egress from the residential unit 500, even though these dead mosquitos 50D were not trapped by the net 100, 200, 300, 400. Mosquitos 50 that are trapped and/or killed within the net 100, 200, 300, 400 are generally not able to escape the net 100, 200, 300, 400, much less the residential unit 500, to continue circulating throughout the community at large.

In determining a theoretical model to predict the efficacy of the nets 100, 200, 300, 400 disclosed herein, it was assumed that the flight track of mosquitoes is random, the diameters of the receptacles 80 into the trap chambers 130, 230, 330, 430 are large enough not to affect the flight path of mosquitoes, and that the trapping of the mosquitos does not perturb the flight velocity of any remaining untrapped mosquitoes present in the residential unit 500.

Figure 6A:
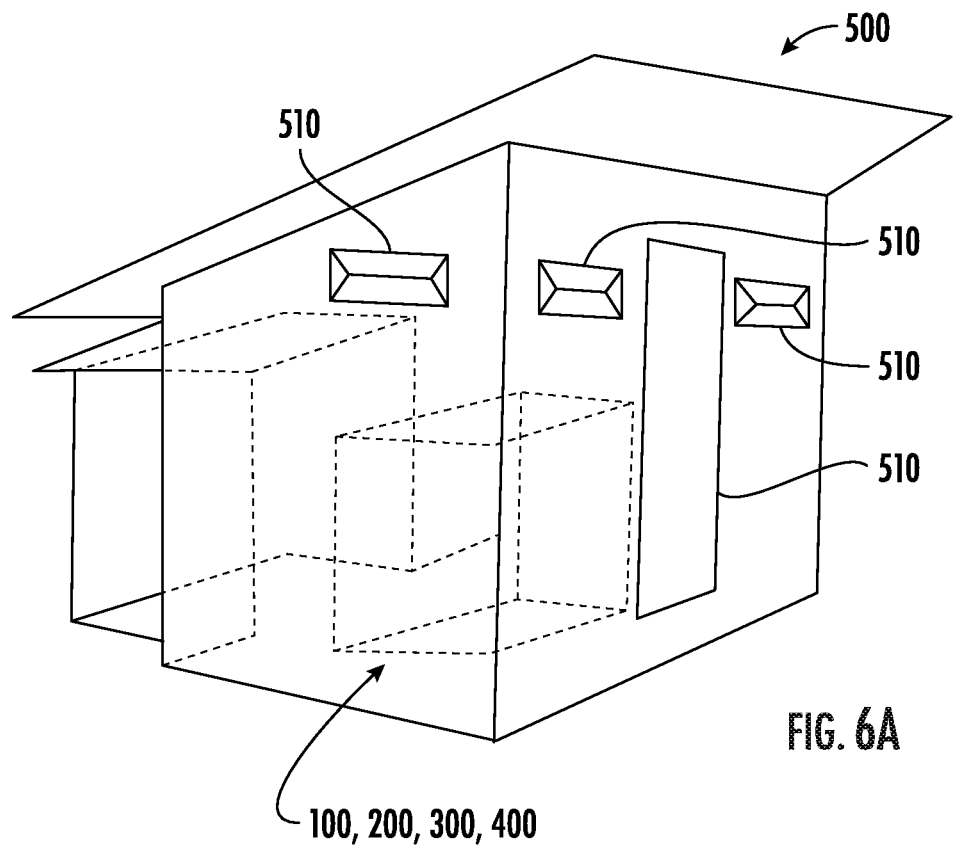
FIG. 6A is a schematic perspective view of a net for trapping mosquitos therein according to any of the embodiments disclosed herein positioned within an example sleeping unit.
Figure 6B:
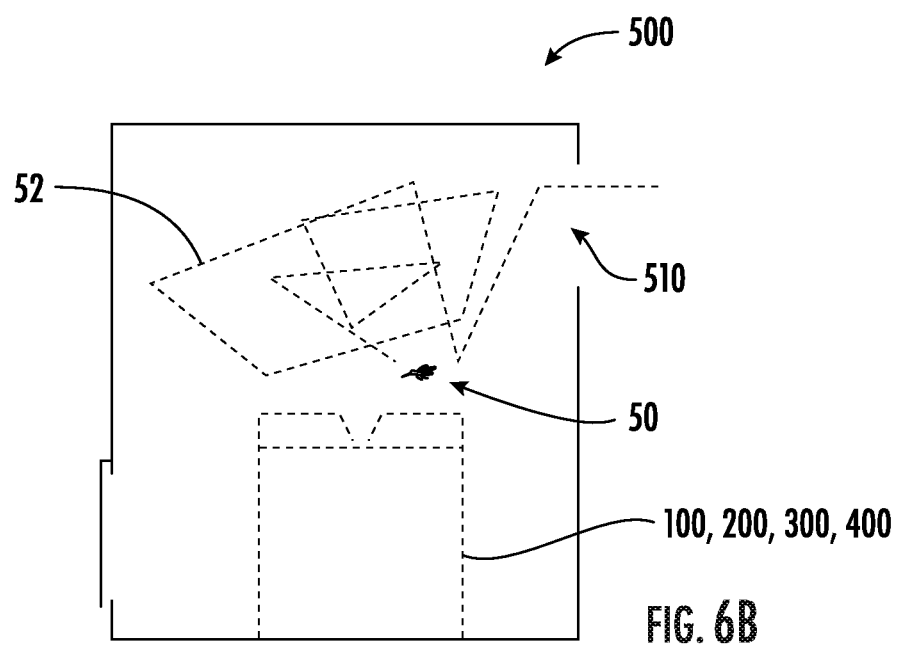
FIG. 6B is a schematic illustration of an example flight path of a mosquito entering the sleeping unit of FIG. 6A.

FIG. 6A shows an example embodiment of a residential unit, generally designated 500, with one or more entryways 510 (e.g., windows and/or doors) formed in an exterior thereof for ventilation, and through which a mosquito would be able to pass if not closed. As shown in FIG. 6A, a net 100, 200, 300, 400 according to one of the example embodiments disclosed herein is installed within the residential unit 500. FIG. 6B schematically shows the flight path 52 of a mosquito 50 after entering a residential unit 500 through, for example, and entryway 510, as having both random and targeted aspects, as the mosquito 50 is generally able to hone in on the top surface of the net 100, 200, 300, 400 based on the presence of a $CO_2$ plume emanating therefrom.

Figure 7:
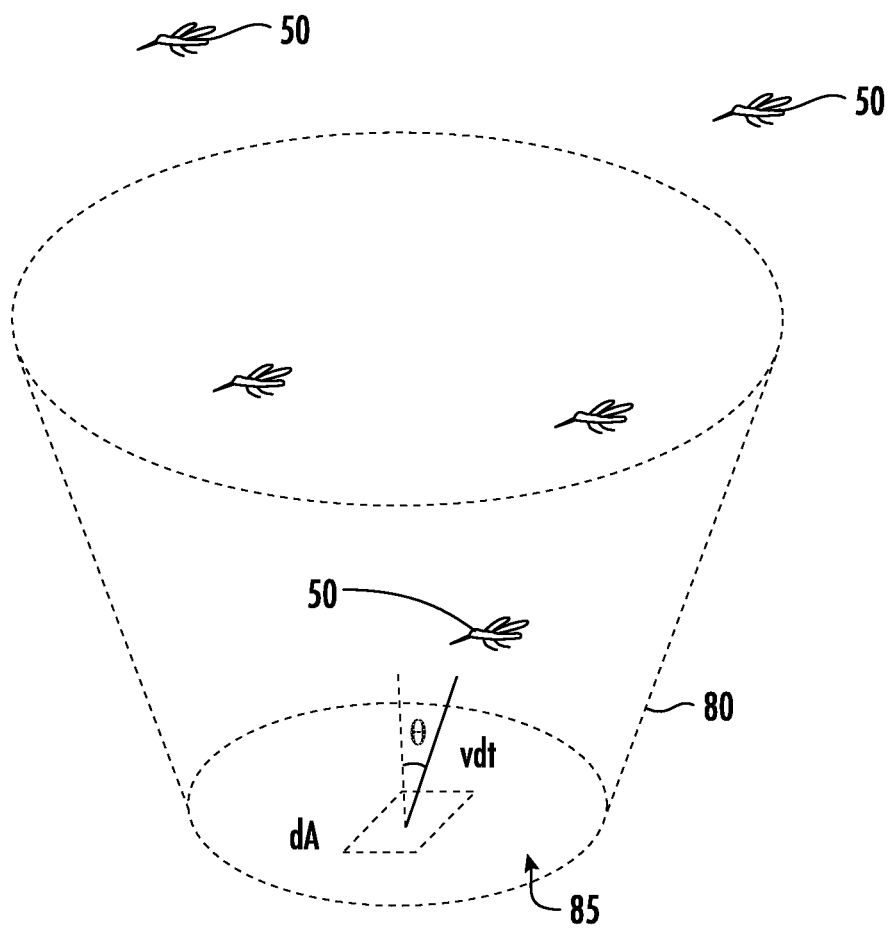
FIG. 7 is a schematic illustration showing mosquitos entering a frustoconically-shaped region.

FIG. 7 schematically shows an assumed hole area dA, a mosquito 50 that is at a distance vdt from the hole and is moving at a speed v at an angle θ from the normal surface toward the area dA. All mosquitos 50 within a parallelepiped volume (e.g., within receptacle 80) around the area dA moving toward the hole with speed v will pass through the mouth of the cone in the time interval dt. Therefore, the total number of mosquitos 50 that will pass through the area dA in the time interval dt can be expressed according to the equation:

$$N_A = \rho v \cos \theta \, dA \, dt \qquad (1)$$

where ρ is the mosquito density in the residential unit 500.

Assuming the distribution of the speeds v of individual mosquitos 50 obeys the Maxwell-Boltzmann distribution, which was first defined and used for describing particle speeds in idealized gases, one integrated expression of the distribution relates particle density with average velocity. Similarly, the average trapped mosquito number per area per time is can then be expressed according to the equation:

$$\dot{N} = C \bar{v} \rho \qquad (2)$$

where $\bar{v}$ is the average flight speed, p is the mosquito density in the residential unit 500 and C is a constant determined by the active behavior of the mosquito (i.e., ¼ in ideal gas theory).

Since the majority of mosquitos in the residential unit will fly generally in the direction of the top (e.g., outer surface 132) of the net, the work volume can be expressed according to the equation:

$$V_w = V - V_{net} - V_s \qquad (3)$$

where V is the volume of the residential unit 500, $V_{net}$ is the volume of the net 100, 200, 300, 400 and $V_s$ is the volume surrounding the net 100, 200, 300, 400, except the volume on the top of the net 100, 200, 300, 400.

By assuming that mosquitos are distributed evenly on the top of the net 100, 200, 300, 400, the number of trapped mosquitos for each net 100, 200, 300, 400 in the testing time t can be expressed according to the equation:

$$N = C \times a \times \frac{N_{ru} \times \bar{v}}{(V - V_{net} - V_s)} \times t \qquad (4)$$

where $N_{ru}$ is the total number of mosquitos in the residential unit 500, C is a constant, and a is the bottom area of the cone.

Thus, the model for each of the nets 100, 200, 300, 400 relates the number of mosquitos trapped with the container volume and flight velocity. If the number of mosquitos in a hut is variable and other parameters are held constant, the predicted results of equation (4) are shown in FIG. 8A. if $V_{hut}$ is treated as a variable, the predicted results of equation (4) is shown in FIG. 8B.

Overall relative mosquito control can be calculated according to the following equation:

$$\text{Overall relative mosquito control} = \frac{Mu}{(1-D) \times Mi}$$

where Mu is the mortality caused by the untreated net 200, 300, 400, e is the mortality caused by the insecticide-treated control net; D is the deterrent effect (D=((Eu−e))/Eu); Eu is the mean entry number in the untreated net 200, 300, 400; and Ei is the mean entry number in the insecticide-treated control net. The results of this equation are plotted in FIG. 12. The net 400 was determined to be 12.7× more efficacious than the control net, the net 300 was determined to be 9.1× more efficacious than the control net, and the net 200 was determined to be 7.1× more efficacious than the control net.

In some embodiments, the trapping portion of the bed net can be deployed as a single, larger funnel. Alternately, the trapping portion can be in the form of multiple smaller funnels. The receptacles 80 are disposed in the outer surface 132, which is a top, or upper, surface of the net 100, such that the receptacles 80 point downward (e.g., generally aligned with the direction of gravity). In some embodiments, each receptacle 80 can be surrounded by a separate trap chamber, such that the net 100 would have a plurality of trap chambers 100, rather than one single trap chamber 130 extending across the outer surface 132 of the net 100. In the illustrated embodiment of the net 100, the receptacles 80 extend inwardly, into the trap chamber 130, which is internal to the outer surface 132 to form a single large trap chamber 130 covering the top of the net 100. In some embodiments, receptacles 80 can be made from a substantially rigid material to allow mosquitos to pass through the opening formed by the receptacles 80 and can be fixed on the lateral sides of the trap chamber 130. A combination of any and/or all or portions of these embodiments is also provided.

In some embodiments, the net 100, 200, 300, 400 does not use (e.g., is free, or devoid, of) chemical insecticides. The mosquitos become ensnared in the trap chamber 130, 230, 330, 430 and are unable to escape, dying of desiccation.

In some embodiments, the net 100, 200, 300, 400 is washable and foldable for flat storage and/or storage within a small package and is easily assembled and/or disassembled. The net 100, 200, 300, 400 can include a sealable opening 135 (see FIG. 1) into the trap chamber 130, 230, 330, 430 for emptying mosquito carcasses from the interior of the trap chamber 130, 230, 330, 430.

In some embodiments, the net 100, 200, 300, 400 can be rapidly produced and deployed with minimal development and consumer cost. Studies show that the disclosed nets 100, 200, 300, 400 are up to twelve (12) times or more efficacious than nets currently being used for mosquito control. In some embodiments, a trap chamber can be added to conventional nets that currently do not have a trap chamber, either by adding a trap chamber (e.g., with one or more suitably-shaped receptacles 80) to the top surface (e.g., over the entire top surface, or a portion thereof) of the conventional net. In some embodiments, such conventional nets can be modified using receptacles 80 with individual trap chambers (see, e.g., 330, FIGS. 3A, 3B) around each receptacle 80, with one or more such individual trap chambers being mounted on and/or through the outer (e.g., top) surface of such a conventional mosquito control net.

In some aspects, the receptacles 80 of the net 100, 200, 300, 400 comprise enhanced mosquito channeling geometry and/or improved netting construction. In other aspects, the nets 100, 200, 300, 400 can be treated with mosquito attractants.

In further aspects, the nets 100, 200, 300, 400 can be configured to optimize space in the occupant chamber about and/or around the head of the occupant of the net 100, 200, 300, 400. The net 100, 200, 300, 400 can additionally be configured to optimize the shape and/or depth of the trap chamber 130, 230, 330, 430 to minimize egression of the mosquitos. The receptacles 80 can be of any shape that promotes entry into the trap chamber 130, 230, 330, 430 and reduces the probability of egression of the mosquitos from the trap chamber 130, 230, 330, 430 after the mosquitos have passed therein through the mouth 85 of the receptacle 80. In some embodiments, the receptacles 80 can be of different sizes, numbers, and/or positions on the net 100, 200, 300, 400 to allow mosquitos to enter the trap chamber 130, 230, 330, 430. The size and dimensions of the trap chamber 130, 230, 330, 430 can be adjusted according to the measured results to maximize the number of mosquitos trapped. Also, the openings can be of different shapes, for example, round, square, rectangle, etc. In some embodiments, the receptacles 80 can comprise flaps to partially cover the inlet and/or outlet of the receptacles, or the receptacles 80 can be partially occluded by structures of different types, for example, by textile materials having a low density number of threads.

Mosquitos are highly attracted to carbon dioxide ($CO_2$). When a person is sleeping and relatively motionless, their exhalation plume of warm $CO_2$ rises, acting to attract mosquitos. Studies have shown that, when mosquito control nets are used over beds where people sleep, the majority of mosquito activity occurs at the top surface of the net. As such, the presently disclosed subject matter includes, in some embodiments, carbon dioxide channeling as part of the function of the nets 100, 200, 300, 400 in increasing the efficacy thereof in trapping and killing mosquitos.

For openings, such as receptacles 80, or other structures that promote mosquitos entering into the trap chamber, it has been determined that there is a preferred diameter of the opening and the number of openings relative to the diameter and also relative to the outside area of the trap chamber, the volume of the trap chamber, the shape of the trap chamber, and the presence of structures of different forms inside the trap chamber. In the example embodiments of the nets, 100, 200, 300, 400 shown and discussed herein, the optimum diameter is defined with a possible variation around plus/minus 68%. These abovementioned parameters themselves, irrespective of the shape of the receptacle (e.g., a cone, or cone equivalent), affect both mosquito trapping and a low egression rate once the mosquitos have been trapped (e.g., have entered the trap chamber). This impacts the carbon dioxide plume and trapping efficacy and includes the carbon dioxide penetration rate of the textile material in which the trap chamber is constructed. Thus, the net 100, 200, 300, 400 can be constructed in a manner to affect the path and/or presence of carbon dioxide. For example, in some embodiments, the sides (see, e.g., walls 236, FIG. 2B) of the trap chamber can be constructed with a textile that does not readily transmit carbon dioxide. Alternately, the sides and the top or just the top of the trap chamber can be constructed of a material that does not transmit carbon dioxide, forcing the carbon dioxide in the exhaled plume to pass through only the available openings and to advantageously increase the attraction rate of mosquitos entering the trap chamber. It is also possible to add additional structure into the interior of the trap chamber to both improve carbon dioxide channeling and at the same time reduce egression by providing barriers once the mosquito is in the trap.

According to the present disclosure, mosquitos seeking the source of the $CO_2$ plume enter a trap chamber on a top surface of the net, which has one or more openings in the outer surface. The openings are designed such that they are large enough for the mosquitos to easily pass through as they follow the plume of $CO_2$, but small enough that they cannot easily find the opening to exit. In a preferred embodiment, the openings are cones or funnels sewn into the outer fabric layer of the trap chamber. Mosquitos enter the funnel through an area that decreases in size as they pass through it. Once the mosquitos pass through the large diameter portion of the funnel, they travel through the mouth of the funnel toward the $CO_2$ and into the trap chamber. The mosquitos are not able to reach the subject in the occupant chamber, and they are generally prevented from leaving the trap chamber due to the small diameter of the mouth of the funnel on the interior of the trap chamber. The mosquitos then die of desiccation and/or starvation.

The net can be configured in different ways depending on a number of variables, such as, but not limited to, surroundings, mosquito species, and user preferences. For example, in the example embodiments of FIGS. 1-2B, 4A, and 4B, the size of the trap chamber can be designed to cover the entire top surface of the net or, as shown in the example embodiment of FIGS. 3A and 3B, the trap chamber can be formed in a more limited, smaller region of the net. In an alternate embodiment, the trap chamber can be produced as a stand-alone portion and then attached to a conventional net suitable to control mosquitos. Such a conventional net can either include or be free of (e.g., devoid of) chemical insecticide(s). In particular, the material from which the net is made can be configured to channel the carbon dioxide through the receptacles to help focus mosquito activity towards the entrances of the receptacles. This direction of mosquito attraction can be achieved in some embodiments by making the top surface and/or sides of the trap compartment impermeable to carbon dioxide, as one example.

In some embodiments, various regions of the net(s) 100, 200, 300, 400 can have the same or different color as other regions of the T-net. For example, since color influences the attraction of mosquitos, in some embodiments it may be advantageous to make the trap chamber 130, 230, 330, 430 have a color that is darker than the color of another region (e.g., the occupant chamber 120, 220, 320, 420) to increase the attraction of mosquitos and/or to reduce the visibility of dead mosquitos.

Another advantage of the disclosed nets 100, 200, 300, 400 is that each is easily washable with only water. Furthermore, mosquito carcasses can pass through the material of the nets 100, 200, 300, 400 without damaging the net 100, 200, 300, 400 itself. This allows easy maintenance and cleaning of such nets 100, 200, 300, 400. Since the nets 100, 200, 300, 400 can be used without applying chemicals insecticides thereto, there is no danger of releasing pesticides into water systems while washing the mosquito carcasses out of the nets 100, 200, 300, 400. Another advantage is that the time and effort needed to wash the nets 100, 200, 300, 400 to effectuate the removal of mosquito carcasses is reduced compared to conventional mosquito nets. For example, a two-minute rinse in a local stream has been shown to be effective in removing dead mosquito carcasses from the nets 100, 200, 300, 400.

Another advantage associated with the presently disclosed nets 100, 200, 300, 400 is that it is thought that increasing the use of such physical barrier devices (and reducing the use of conventional nets having chemical insecticides applied thereto) could lead to an eventual decline in insecticide resistance in mosquitos, particularly in areas known to have chemically resistant mosquito populations. It is thought that this may allow the eventual reintroduction of currently known chemical insecticides into areas in which such insecticide-resistant mosquitos are prevalent.

Use of the nets 100, 200, 300, 400 disclosed herein may also lead to increased use of nets for mosquito control in general. The usefulness of sleeping under a net is reinforced when the user empties the trap chamber and observes the number of mosquitos trapped. This may encourage users to follow the usage directions properly and use such nets more frequently. Also, since the users are not exposed to a chemical insecticide, it is thought that this elimination in exposure to an insecticide might promote net use for users that want to avoid exposure to insecticide(s). If insecticides pose even a perceived health risk, whether known or not, the presently disclosed nets 100, 200, 300, 400 eliminate this risk.

In some embodiments, at least a portion of the nets 100, 200, 300, 400 is treated with an insecticide. In some such embodiments, only the sides (e.g., all of the sides) of the occupant chamber 120, 220, 320, 420 are treated with one or more insecticides. In some embodiments, the insecticide is applied on the sides of the trap chamber 130, 230, 330, 430 and the occupant chamber 120, 220, 320, 420, which can be advantageous because chemical-resistant mosquitos can be repelled by the insecticide on the sides of the net 100, 200, 300, 400. However, because even these insecticide-resistant mosquitos are still drawn towards and will follow the path of $CO_2$ plume, these insecticide-resistant mosquitos will nevertheless fly to the outer, or top, surface 132, 232, 332, 432 of such nets 100, 200, 300, 400, into and through the receptacles 80, and then into the trap chamber 130, 230, 330, 430, from which the mosquitos are unable to regularly find an exit, and in which the majority of the mosquitos that enter therein will die. Applying one or more insecticides to at least portions of the sides of the net as described hereinabove is further advantageous because, during typical use and over the useable life of such nets 100, 200, 300, 400, they will almost invariably develop holes from human use. As such, when the sides of the nets 100, 200, 300, 400 are treated with insecticide(s), the insecticide-resistant mosquitos will still be repelled by the insecticide will not go through the damage-induced holes; Rather, these insecticide-resistant mosquitos will still fly into the trap compartment as described hereinabove. In such embodiments, mosquitos that are not insecticide-resistant will invariably come into contact with the side of such nets 100, 200, 300, 400 and would be killed due to exposure to the insecticide. In some embodiments, the sides or bottom of the trap chamber 130, 230, 330, 430 can be treated with insecticide(s) to kill mosquitos within the trap chamber 130, 230, 330, 430 more quickly and/or to reduce the rate of success of mosquitos trapped within the trap chamber 130, 230, 330, 430 from finding a path out of the trap chamber 130, 230, 330, 430.

In some embodiments, the bed net is constructed by stamping the receptacles 80 (e.g., to be in the shape or a cone or a cone equivalent, including any receptacle shape that has the functions described herein) into the same or different type of material used for at least the outer, or top, surface 132, 232, 332, 432 and/or of the outer shell 110, 210, 310, 410 of the net 100, 200, 300, 400. This stamped material for the receptacles 80 can then be sewn into the net 100, 200, 300, 400 or the stamping formed on the outer, or top, surface 132, 232, 332, 432 of the trap chamber 130, 230, 330, 430.

The material used for stamping the receptacles 80 can be any suitable material for forming the receptacle 80 and retaining the shape of the receptacle 80 over time and use (e.g., not deforming so that the mouth 85 of the receptacle(s) substantially retains its original cross-sectional shape). For example, some materials described hereinabove can be used for heat setting the receptacles in a desired shape (e.g., conical or frustoconical), or any other suitable yarn type used for heat setting. The presently disclosed subject matter is not limited to these particular materials but can also include others that impart these same characteristics both in immediate function and that are compatible to the function of the disclosed nets 100, 200, 300, 400 (e.g., to trap and kill mosquitos). A heat press used for stamping can be configured to form single or multiple receptacles having a generally frustoconical shape and of any optimum size.

According to another example embodiment, a kit of parts for the net is also provided. In some embodiments, the kit of parts can comprise one or more of the presently disclosed nets 100, 200, 300, 400 and a container for the one or more nets 100, 200, 300, 400. Each device in the kit can comprise a different configuration. In the example embodiments shown in FIGS. 13A-16, which will be described further herein, a kit of parts, generally designated 600, is configured for converting a conventional (e.g., insecticide-laden) mosquito control net 10 into a trapping mosquito control net (e.g., one of nets 100, 200, 300, 400).

As can be seen in FIGS. 13A and 13B, the kit of parts 600 can include, for example and without limitation, a funnel-shaped receptacle 80 that is surrounded by a trap chamber, generally designated 90, which includes a bag 92 of any shape form the trap chamber 90 of the converted trapping mosquito control net using the kit of parts 600. The kit of parts 600 can also include a collar, generally designated 70. The collar 70 is generally annularly shaped and has threads 72 formed on an outer circumferential surface thereof, which are formed complementarily with internal threads 82 that are formed on an inner circumferential surface of an annularly shaped portion of the receptacle 80, so that the threads 72 of the collar 70 can be twistably engaged with the internal threads 82 of the receptacle 80 to secure the collar 70 and the receptacle 80 together. The trap chamber 90 has an upper ring 94 that is made from a substantially rigid material (e.g., plastic, metal, and the like), to which the material that forms the bag 92 is rigidly (e.g., integrally) attached to prevent separation therefrom. The trap chamber 90 has threads 96 formed on and/or about an inner circumferential surface of the upper ring 94. The threads 96 are shaped complementary to (e.g., to threadably engage and/or interlock with) threads 86 that are formed on an outer circumferential surface of the annular portion of the receptacle 80, such that the entire trap chamber 90 may be threaded onto or off of the receptacle 80 without requiring the collar 70 and/or the receptacle 80 from being removed from the net 10. This is advantageous in that it allows the trap chamber 90 to be threadably removed from the receptacle 80 and also from the net 10 to allow, for example, dead mosquitos to be removed from the trap chamber 90 that have been trapped and killed therein and/or to allow for washing of the bag 92 separate from the remainder of the net 10. The bag 92 is made of a material that is permeable to $CO_2$ but that is impermeable to mosquitos (e.g., all mosquitos or at least species of mosquitos that are a malaria vector and are prevalent in the region in which the kit of parts 600 is to be deployed). In some embodiments, the kit of parts 600 may include a plug to cover the opening of the collar 70 to prevent egress of any mosquitos from the trap chamber 90, for example and without limitation, after a subject has awaken and while mosquitos within the trap chamber 90 remain alive.

Figure 14:
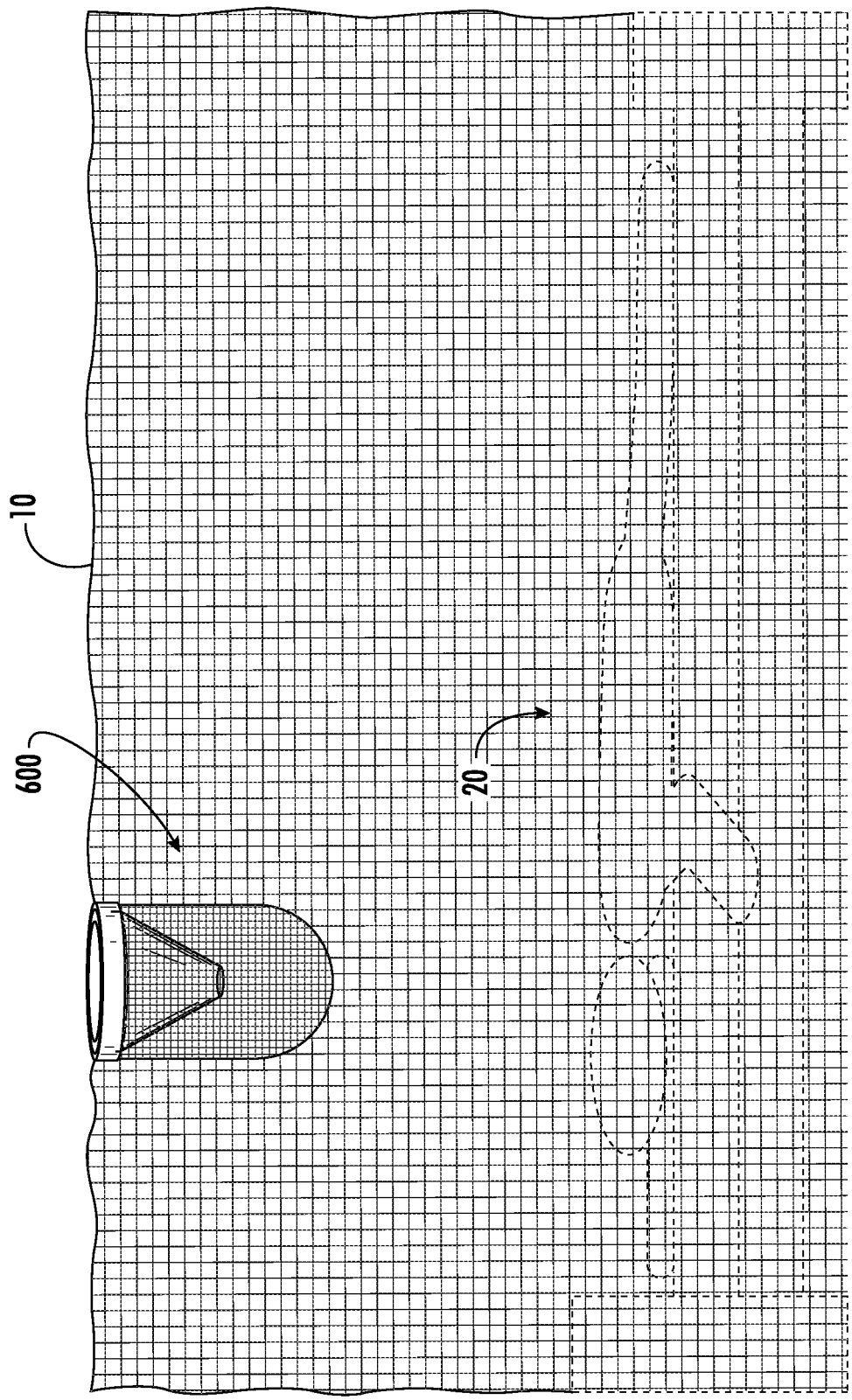
FIG. 14 is a schematic side view of an example embodiment of a trapping mosquito control net with the kit of parts of FIGS. 13A and 13B attached thereto, the net being positioned over a subject contained within an interior thereof.
Figure 15A:
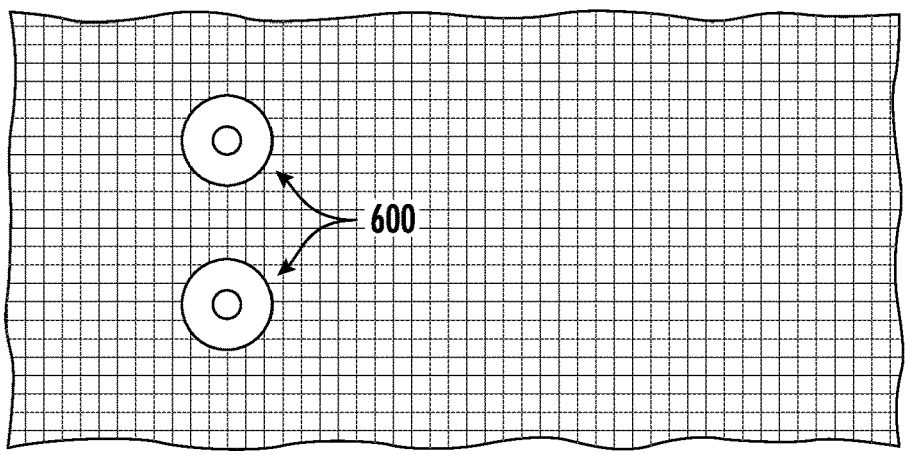
FIG. 15A is a top view of an example embodiment of a trapping mosquito control net with a plurality of kits of parts of FIGS. 13A and 13B attached thereto.
Figure 15B:
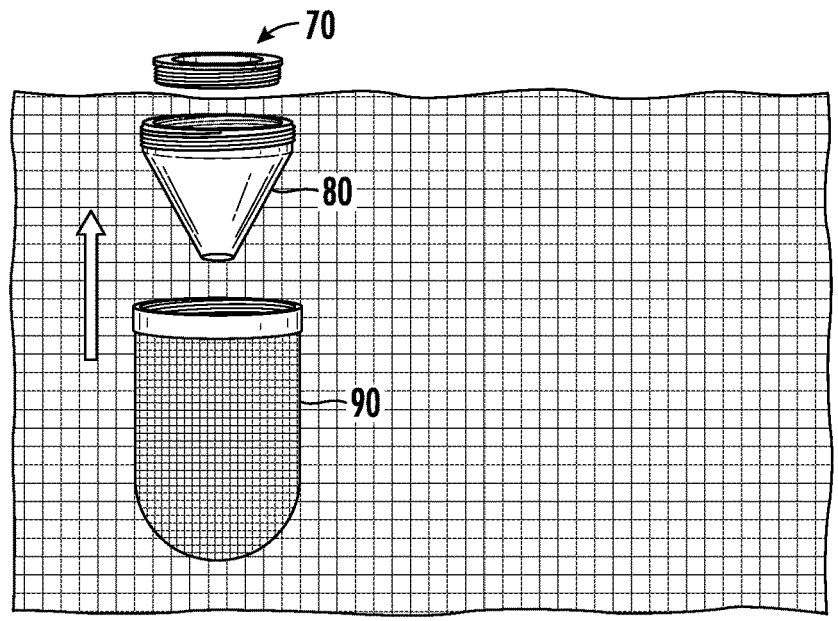
FIG. 15B is a schematic side view showing the arrangement of the various parts of the kit of parts of FIGS. 13A and 13B as the kit of parts is installed on a conventional mosquito control net to convert it into a trapping mosquito control net.
Figure 16:
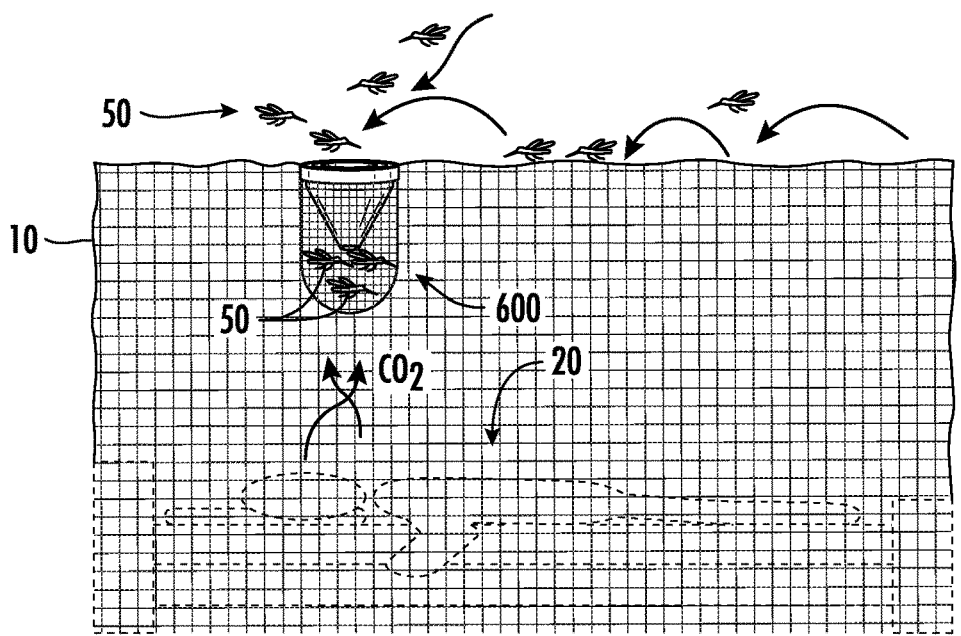
FIG. 16 is a schematic side view of mosquitos entering and being trapped within the trap chamber formed by the kit of parts of FIGS. 13A and 13B, which is attached to a converted trapping mosquito control net with a subject contained within an interior thereof to lure mosquitos into the trap chamber.

The kit of parts 600 could be applied to the top of any conventional mosquito control net 10, an example of which is shown in FIGS. 14-16 to convert the conventional mosquito control net 10 into a trapping mosquito control net according to one or more of the example embodiments disclosed herein. with the collar 70 has an opening formed through a thickness thereof (e.g., aligned with the direction of assembly, as shown in FIG. 13A) that is large enough to allow mosquitos to pass therethrough without deterring the mosquitos from passing therethrough. When the collar 70 and the receptacle 80 are attached to the net 10, they form a base to which the trap chamber 90 can be removably and/or permanently attached. In some embodiments, the collar 70 and/or the receptacle 80 (e.g., using the threads 72, 82 thereof) is/are configured to, as they are screwed together (e.g., from opposing sides of) to be secured to the conventional net 10, cut an opening in the top surface of the conventional net 10 and is configured to mount the receptacle 80 under (e.g., suspended vertically from) the top surface of the net 10 after being attached thereto. In some embodiments, the user will manually cut a hole in the portion of the net 10 captured within the opening of the collar 70 to remove at least a portion (e.g., all) of the net 70 exposed within the opening of the collar 70.

In some embodiments, the kit of parts 600 comprises or consists of a receptacle 80 (e.g., having a generally frustoconical shape) that is surrounded by a trap chamber that a user is able, after cutting a hole having a suitable cross-sectional shape (e.g., round) in the top surface of the net and either sews the trap chamber into place within the conventional net or uses an adhesive that is provided on a portion of the trap chamber and/or receptacle that fixes the structure to the inside and/or outside of the top surface of the conventional net. In some embodiments, the adhesive is dispensed onto the portion of the trap chamber 92 manually by a user from a container of adhesive included in the kit of parts 600. It is to be understood that iterations are not limited to these examples and that the receptacles could be of any shape that promotes a high mosquito capture rate and low mosquito egression rate. The receptacles can further be made from any textile type.

FIG. 15A shows another embodiment in which two kits of parts 600 are attached to a top surface of a net 10 such that the net will have a plurality of discrete trap chambers to increase the efficacy of trapping mosquitos within the assembled kit of parts 600.

FIG. 15B schematically shows an embodiment for the assembly of the kit of parts 600 to a net 10. According to this embodiment, the collar 70 is positioned on a first (e.g., external) side of the net 10 and the receptacle is positioned on a second (e.g., internal) side of the net 10, with the collar 70 and the receptacle 80 being aligned with (e.g., coaxial to) each other. The collar 70 and the receptacle 80 are threadably engaged together. The portion of the net 10 corresponding to the opening formed in the collar 70 can be removed before, at the same time, or after the collar 70 and the receptacle 80 are assembled together with the net 10 secured therebetween. Once the collar 70 and the receptacle 80 are secured to the net 10 to form a base, the trap chamber 90 is threadably engaged over the receptacle 80, preferably in a removable manner so that mosquitos can easily be removed from the trap chamber by a user after the mosquitos contained therein are dead.

FIG. 14 shows a net 10 having a kit of parts 600 according to the subject matter disclosed herein attached to a top surface thereof to conver the net 10 from a conventional mosquito control net into a trapping mosquito control net. Such a trapping mosquito control net converted from a contentional mosquito control net may still be treated with (e.g., have applied thereto) an insecticide. As shown in FIG. 14, the net 10 is positioned over a subject 20 within the net 10 and the kit of parts 600 is advantageously attached to the net 10 in a position corresponding generally to a position above the head of the subject 20. FIG. 16 shows mosquitos 50 being drawn into the trap chamber formed by the kit of parts 600 attached to the net 10 by the presence of $CO_2$ being emitted from the subject 20 within the net 10. In some embodiments, the receptacle 80 can be made of a material that is substantially impermeable to $CO_2$, such that mosquitos 50 are drawn towards the mouth 85 of the receptacle 80 by the flow of $CO_2$ therethrough to promote passage of the mosquitos 50 into the trap chamber 90 formed by the kit of parts 600. The general presence of $CO_2$ about the kit of parts 600 will draw the mosquitos 50 generally towards the kit of parts 600.

OAPI Patent No. 17063, issued on Sep. 1, 2014, is incorporated herein by reference in its entirety.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A mosquito control net comprising:
   an occupant chamber; and
   a trap chamber disposed on the occupant chamber, the trap chamber comprising an interior,
   wherein the trap chamber comprises one or more openings disposed on an outer surface thereof, through which mosquitos enter the trap chamber, wherein each of the one or more openings has a three-dimensional receptacle attached thereto, wherein the receptacle is woven or fabric mesh, the woven or fabric mesh comprising a weave pattern wherein voids in the weave pattern are large enough for a mosquito to pass through in a first direction towards the interior of the trap chamber, but small enough to prevent the mosquito passing therethrough in a second direction, opposite the first direction away from the interior of the trap chamber.

2. The mosquito control net of claim 1, wherein the trap chamber is disposed on one or more side surface of the occupant chamber.

3. The mosquito control net of claim 1, wherein fabric surrounding the occupant chamber and separating the occupant chamber from the trap chamber is substantially impermeable to the mosquitos.

4. The mosquito control net of claim 1, wherein each of the one or more receptacles having a frustoconical, conical, square, rectangular, hemispherical, or triangular shape.

5. The mosquito control net of claim 1, wherein the trap chamber comprises a sealable opening for removing dead mosquitos.

6. The mosquito control net of claim 1, wherein the trap chamber covers an entire upper surface of the occupant chamber.

7. The mosquito control net of claim 1, wherein the trap chamber occupies a partial region of an upper surface of the occupant chamber.

8. A kit of parts for a mosquito exclusion net, comprising one or more of the mosquito control nets of claim 1 and a container for the one or more mosquito control nets.

9. A mosquito control net comprising:

an occupant chamber; and a trap chamber disposed on the occupant chamber, the trap chamber comprising an interior, wherein the trap chamber comprises one or more openings disposed on an outer surface thereof, through which mosquitos enter the trap chamber, wherein the one or more openings are in a form of a funnel disposed on an outer surface of the trap chamber, and wherein the funnels are disposed such that a larger diameter edge is attached to the outer surface, sides, or both of the trap chamber, wherein each funnel comprises a woven fabric, the woven fabric comprising a weave pattern wherein voids in the weave pattern are large enough for a mosquito to pass through in a first direction towards the interior of the trap chamber but small enough to prevent the mosquito passing therethrough in a second direction, opposite the first direction away from the interior of the trap chamber.

10. The mosquito control net of claim 9, comprising a plurality of funnels.

11. The mosquito control net of claim 10, wherein the plurality of funnels have an arrangement consisting of centered along and about a longitudinal axis of the mosquito control net.

12. The mosquito control net of claim 11, wherein each of the plurality of funnels has an inlet, which is attached to one of the one or more openings, and an outlet, which extends within the trap chamber.

13. The mosquito control net of claim 12, wherein the inlet is larger than the outlet for each of the funnels.

14. The mosquito control net of claim 10, wherein the plurality of funnels have an arrangement consisting of a circular aggregate proximate to an end of the mosquito control net.

15. The mosquito control net of claim 9, comprising a single funnel in the trap chamber, the single funnel and the trap chamber positioned proximate to an end of the mosquito control net.

16. A method for preventing mosquito bites for a subject, the method comprising:

providing a mosquito control net of claim 1; and occupying, by the subject, the mosquito control net.

17. The method of claim 16, comprising emptying the trap chamber of mosquito carcasses and/or washing the mosquito control net with water.

18. A method for preventing mosquito bites for a subject, the method comprising:

providing a mosquito control net of claim 5; and occupying, by the subject, the mosquito control net.

* * * * *